(12) United States Patent (10) Patent No.: US 12,218,371 B2
Kashiwai et al. (45) Date of Patent: Feb. 4, 2025

(54) BATTERY HOUSING APPARATUS AND ELECTRIC VEHICLE

(71) Applicant: Honda Motor Co., Ltd., Tokyo (JP)

(72) Inventors: Mikio Kashiwai, Wako (JP); Tadahiro Yaguchi, Wako (JP); Masahiko Yamagishi, Wako (JP); Katsunori Okubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 17/766,394

(22) PCT Filed: Oct. 8, 2020

(86) PCT No.: PCT/JP2020/038109
§ 371 (c)(1),
(2) Date: Apr. 4, 2022

(87) PCT Pub. No.: WO2021/070897
PCT Pub. Date: Apr. 15, 2021

(65) Prior Publication Data
US 2022/0278410 A1 Sep. 1, 2022

(30) Foreign Application Priority Data

Oct. 11, 2019 (JP) .................................. 2019-187447
Dec. 25, 2019 (JP) .................................. 2019-234167

(51) Int. Cl.
*H01M 50/249* (2021.01)
*H01M 50/242* (2021.01)
(Continued)

(52) U.S. Cl.
CPC ....... *H01M 50/249* (2021.01); *H01M 50/242* (2021.01); *H01M 50/244* (2021.01); *H01M 50/273* (2021.01); *H01M 2220/20* (2013.01)

(58) Field of Classification Search
CPC ............. H01M 50/249; H01M 50/242; H01M 50/244; H01M 50/273
(Continued)

(56) References Cited

U.S. PATENT DOCUMENTS 2,607,433 A 8/1952 Simi
2,709,494 A 5/1955 Luce
(Continued)

FOREIGN PATENT DOCUMENTS

CN 102810653 A 12/2012
CN 105189275 A 12/2015
(Continued)

OTHER PUBLICATIONS

European Search Report; Application EP20874118; Sep. 26, 2023.
(Continued)

*Primary Examiner* — Hau V Phan
(74) *Attorney, Agent, or Firm* — Duft & Bornsen, PC

(57) ABSTRACT

A battery housing apparatus including a housing portion forming a housing space in which a battery is removably housed, a holding portion configured to hold the battery, and an openable cover portion closing the housing space. The housing portion includes a support portion rotatably supporting the holding portion about a rotational axis so that the battery is movable between a housed position and a non-housed position in the housing space.

19 Claims, 34 Drawing Sheets

(51) Int. Cl.
 H01M 50/244 (2021.01)
 H01M 50/273 (2021.01)

(58) Field of Classification Search
 USPC ........................................................ 180/68.5
 See application file for complete search history.

(56) References Cited

U.S. PATENT DOCUMENTS

| | | | | |
|---|---|---|---|---|
| 5,613,569 | A * | 3/1997 | Sugioka | H01M 10/625 |
| | | | | 180/68.5 |
| 6,624,610 | B1 * | 9/2003 | Ono | B62J 43/16 |
| | | | | 320/104 |
| 7,255,191 | B2 * | 8/2007 | Baldwin | B62K 11/10 |
| | | | | 180/312 |
| 8,418,795 | B2 * | 4/2013 | Sasage | B62K 11/10 |
| | | | | 180/220 |
| 8,455,128 | B2 * | 6/2013 | Belton | B60L 58/15 |
| | | | | 429/96 |
| 9,108,527 | B2 * | 8/2015 | Platz | B60K 1/04 |
| 9,193,410 | B2 * | 11/2015 | Watanabe | B62M 7/12 |
| 9,216,787 | B2 * | 12/2015 | Duncan | B62J 43/23 |
| 9,950,602 | B2 * | 4/2018 | Duan | B62K 19/30 |
| 10,046,667 | B2 * | 8/2018 | Orimo | H01M 50/204 |
| 10,384,740 | B1 * | 8/2019 | Cheng | B60K 1/04 |
| 10,518,841 | B2 * | 12/2019 | Talavasek | B62K 19/18 |
| 11,299,229 | B2 * | 4/2022 | Buell | B62K 19/30 |
| 11,325,678 | B2 * | 5/2022 | Wecker | B62K 19/40 |
| 2002/0166709 | A1 * | 11/2002 | Michisaka | B62J 11/19 |
| | | | | 180/219 |
| 2006/0180373 | A1 * | 8/2006 | Hanagan | B62K 11/00 |
| | | | | 180/219 |
| 2019/0157641 | A1 * | 5/2019 | Koropachinsky | B60L 3/0015 |
| 2019/0232804 | A1 | 8/2019 | Chen | |
| 2019/0337588 | A1 * | 11/2019 | Wecker | B62K 19/40 |
| 2020/0079459 | A1 * | 3/2020 | Mercier | B60K 1/04 |
| 2020/0223504 | A1 * | 7/2020 | Buell | B62J 1/08 |
| 2020/0231241 | A1 * | 7/2020 | Knitt | B62K 11/00 |

FOREIGN PATENT DOCUMENTS

| | | |
|---|---|---|
| CN | 110104106 A | 8/2019 |
| EP | 2978659 A1 | 2/2016 |
| EP | 3290323 A1 | 3/2018 |
| JP | S5753982 U | 3/1982 |
| JP | H05112270 A | 5/1993 |
| JP | H08264168 A | 10/1996 |
| JP | H11208548 A | 8/1999 |
| JP | 2001045606 A | 2/2001 |
| JP | 2008080841 A | 4/2008 |
| JP | 2012091689 A | 5/2012 |
| JP | 3212748 U | 9/2017 |
| JP | 2019131166 A | 8/2019 |
| WO | 2019207712 A1 | 10/2019 |

OTHER PUBLICATIONS

International Search Report; Application PCT/JP2020/038109; Dec. 28, 2020.

Chinese office action; Application 202080070328.4; May 20, 2023.

* cited by examiner

FRONT ←——→ REAR

REAR ← → FRONT

REAR ← → FRONT

BATTERY HOUSING APPARATUS AND ELECTRIC VEHICLE

CROSS-REFERENCE TO RELATED APPLICATION

This application is a National Stage of PCT international application Ser. No. PCT/JP2020/038109 filed on Oct. 8, 2020 which designates the United States, incorporated herein by reference, and which is based upon and claims the benefit of priority from Japanese Patent Application No. 2019-187447, filed on Oct. 11, 2019 and Japanese Patent Application No. 2019-234167, filed on Dec. 25, 2019, the entire contents of which are incorporated herein by reference.

TECHNICAL FIELD

This invention relates to a battery housing apparatus in which a battery is housed and an electric vehicle.

BACKGROUND ART

Electric vehicles have been known in which a battery for supplying power to a travel electric motor is disposed below a seat (for example, see Patent Literature 1). In an electric vehicle described in Patent Literature 1, a case is disposed between a pair of left and right floor frames extending in the front-rear direction below a seat so as to be fixed to the floor frames, and a battery is housed in the case.

CITATION LIST

Patent Literature

Patent Literature 1: Japanese Unexamined Patent Publication No. 2012-091689

DISCLOSURE OF INVENTION

Problems to be Solved by the Invention

However, in the case of the electric vehicle of Patent Literature 1, the battery is housed in the case fixed to the floor frames below the seat and therefore the removability of the battery is poor.

Means for Solving Problem

An aspect of the present invention is a battery housing apparatus including: a housing portion configured to form a housing space of a battery, the battery being removably housed in the housing space; a holding portion configured to hold the battery; and a cover portion configured to close the housing space in an openable manner. The housing portion includes a support portion rotatably supporting the holding portion about a rotational axis so that the battery is movable between a housed position and a non-housed position in the housing space.

Another aspect of the present invention is an electric vehicle including: the above battery housing apparatus; a battery configured to supply an electric power to a travel motor; and a placement portion on which a left and right legs of a passenger are placed. The housing space of the battery housing apparatus in which the battery is housed, is formed below the placement portion or between a left and right placement portions in a left-right direction.

Effect of the Invention

According to the present invention, a removability of a battery can be improved.

DESCRIPTION OF EMBODIMENT

First Embodiment

Now, a first embodiment of the present invention will be described with reference to FIGS. 1A to 14. Electric vehicles according to embodiments of the present invention are formed as, for example, one-passenger electric vehicles allowed to travel on sidewalks called senior cars, electric wheelchairs, or the like and are used as movement means for people such as those with difficulty in walking. Note that such electric vehicles may be used for other uses and their users (passengers) may be other than people with difficulty in walking.

Figure 1A:
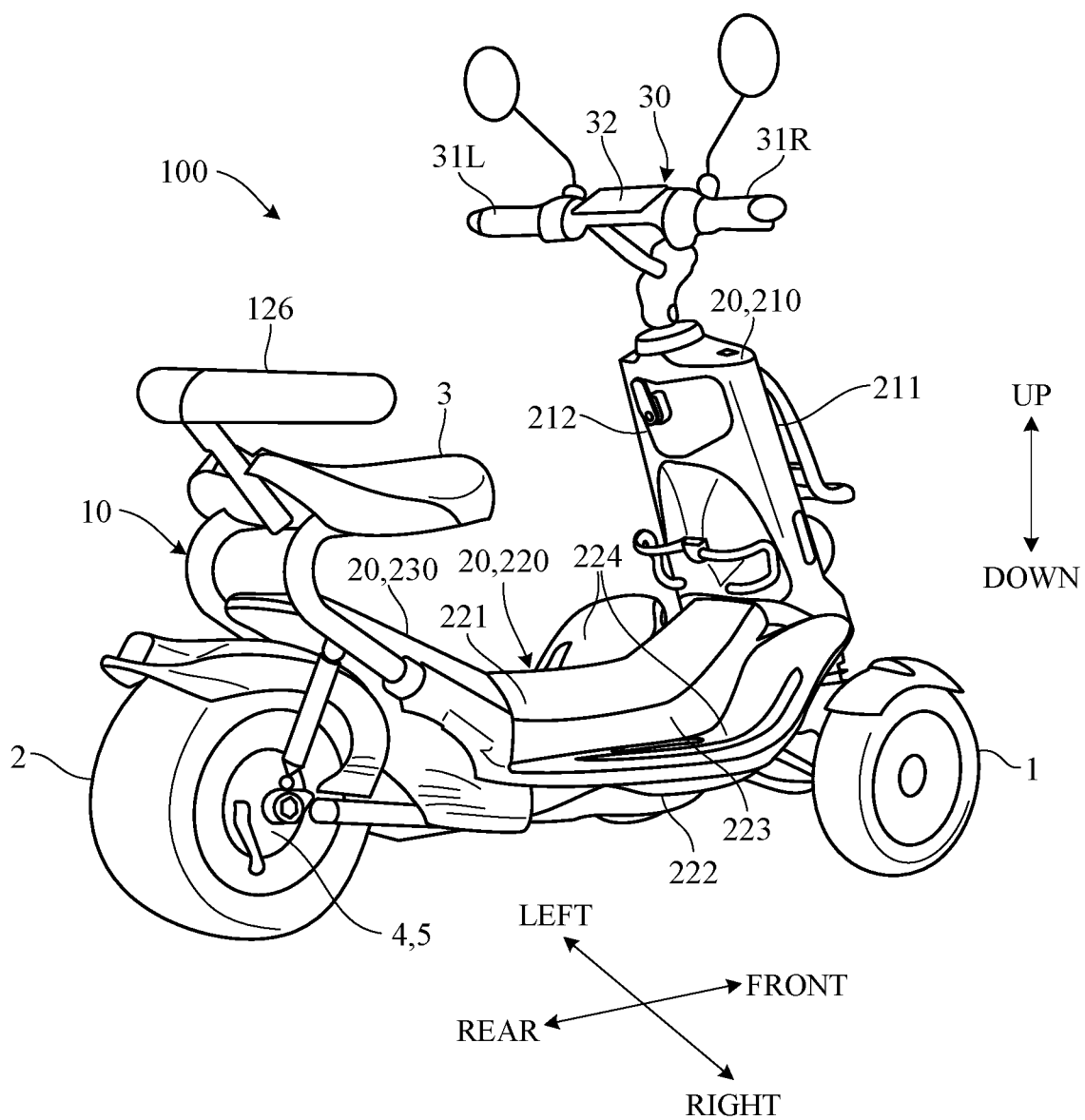
FIG. 1A is a perspective view showing an overcall configuration of an electric vehicle according to a first embodiment of the present invention.
Figure 1B:
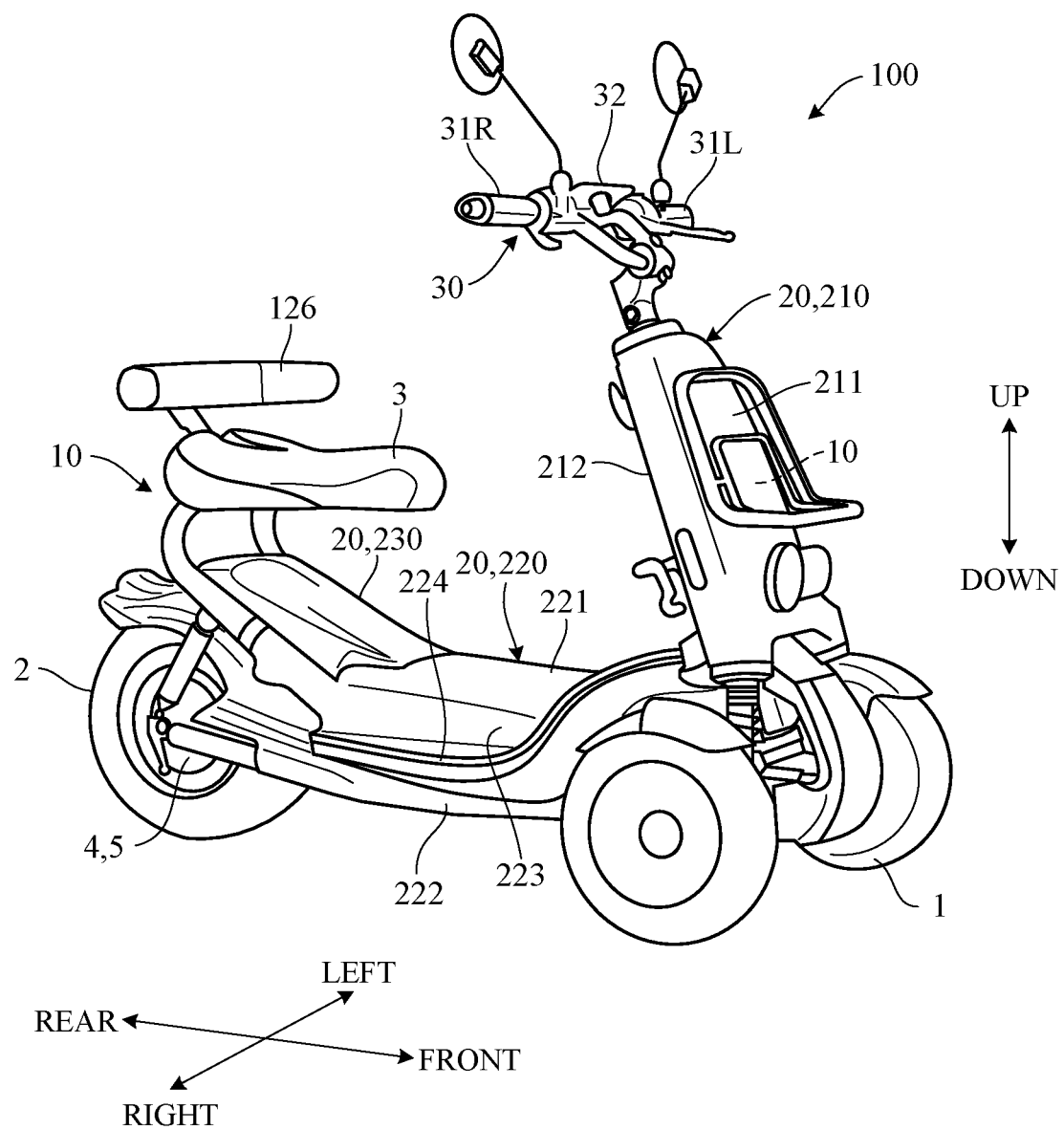
FIG. 1B is a perspective view showing an overcall configuration of the electric vehicle according to the first embodiment of the present invention, seen from a different direction from FIG. 1A.

FIGS. 1A and 1B are perspective views showing the overcall configuration of an electric vehicle (hereafter may be simply referred to as the vehicle) 100 according to the first embodiment of the present invention. The front-rear direction, left-right direction, and up-down direction are defined as shown in the drawings for convenience, and the configuration of the components will be described in accordance with this definition. The front-rear direction is the length direction of the vehicle 100, the left-right direction is the width direction of the vehicle, and the up-down direction is the direction of gravity. When the vehicle 100 is located on a horizontal plane, the up-down direction matches the height direction of the vehicle 100. FIG. 1A is a right rear perspective view of the vehicle 100, and FIG. 1B is a right front perspective view thereof As shown in FIGS. 1A and 1B, the vehicle 100 is formed as a three-wheeled vehicle that includes two front wheels 1 and one rear wheel 2 and uses the rear wheel 2 as a drive wheel. In addition to the front wheels 1 and rear wheel 2, the vehicle 100 mainly includes a frame 10 forming the framework of the vehicle 100, a cover 20 covering the perimeter of the frame 10, a handle 30 operated by a user, and a seat 3 on which the user is seated. The vehicle 100 is formed so as to be approximately bilaterally symmetrical. While the frame 10 is made of a metal having high strength, the cover 20 is made of a resin material. The configuration of the frame 10 will be described later.

The cover 20 broadly includes a front cover 210 extending in the up-down direction below the handle 30, a floor cover 220 extending in the front-rear direction behind the front cover 210, and a rear cover 230 extending obliquely rearward behind the floor cover 220.

The front cover 210 includes a pair of front and rear covers formed such that the frame 10 (a front frame 14 (to be discussed later)) extending from near the front wheels 1 to near the frame 10 is sandwiched therebetween in the front-rear direction, that is, a front cover 211 and a rear cover 212. The front cover 211 and rear cover 212 extend in the left-right and up-down directions and are formed in an approximately rectangular shape. The front cover 211 and rear cover 212 are integrally coupled to each other using fastening means such as a bolt and thus form the front cover 210. The front cover 211 has a light or the like mounted thereon, and the rear cover 212 is provided with a drink holder or the like.

The floor cover 220 includes a pair of upper and lower covers formed such that the frame 10 (side frames 11 (to be discussed later)) extending in the front-rear direction between the front wheels 1 and rear wheel 2 is sandwiched therebetween in the up-down direction, that is, a top cover 221 and a bottom cover 222. Both the top cover 221 and bottom cover 222 extend in the left-right and front-rear directions. A swelling portion 223 swelling upward is disposed on the central portion in the left-right direction of the top cover 221. Steps 224 on which a user seated on the seat 3 places the legs thereof are disposed on both sides in the left-right direction of the swelling portion 223. The front ends of the steps 224 extend obliquely upward so as not to interfere with the front wheels 1. The top cover 221 and bottom cover 222 are integrally coupled to each other using fastening means such as bolts and thus form the floor cover 220.

The rear cover 230 is formed so as to cover the frame 10 (a pair of left and right seat frames 12 to be discussed later) extending rearward upward toward the seat 3. Electric components such as a power control unit are stored inside the rear cover 230 (see FIG. 4).

The seat 3 is located in front of and above (obliquely above) the rear wheel 2 and is formed in a shape elongated in the front-rear direction such that the width becomes narrower in the forward direction. The handle 30 extends in the left-right direction approximately above the front wheels 1 (to be exact, above and slightly behind the handle 30). When getting on the vehicle 100, the user grasps the handle 30 with both hands, sits on the seat 3, and places both legs on the left and right steps 224 of the top cover 221.

A travel motor 4 (in-wheel motor) that is driven by receiving power from a battery 40 (FIG. 2) and a brake unit 5 are housed in the rear wheel 2. For example, the travel motor 4 is disposed on the left side, and the brake unit 5 is disposed on the right side. The brake unit 5 is formed as, for example, a drum brake unit forming a drum brake. The vehicle 100 is driven by driving the travel motor 4 and is given a braking force by activating the drum brake.

Grips 31L and 31R grasped by the user are disposed on the left and right ends of the handle 30. A display 32 for displaying vehicle information such as the remaining battery capacity or set vehicle speed is disposed between the left and right grips 31L and 31R. Various types of user-operable switches, such as a starter switch for issuing a command to turn on and off the main power supply, a forward/rearward switch for issuing a command to switch between forward travel and rearward travel, a winker switch for issuing a command to make a right or left turn, a speed setting switch for issuing a command to set the maximum speed, and a horn switch for issuing a command to activate a horn, are disposed near the grips 31L and 31R. Also, an accelerator lever for inputting a travel command, a brake lever for issuing a command to activate the brake, and the like are disposed near the grips 31L and 31R so as to be operable by the user.

Figure 2:
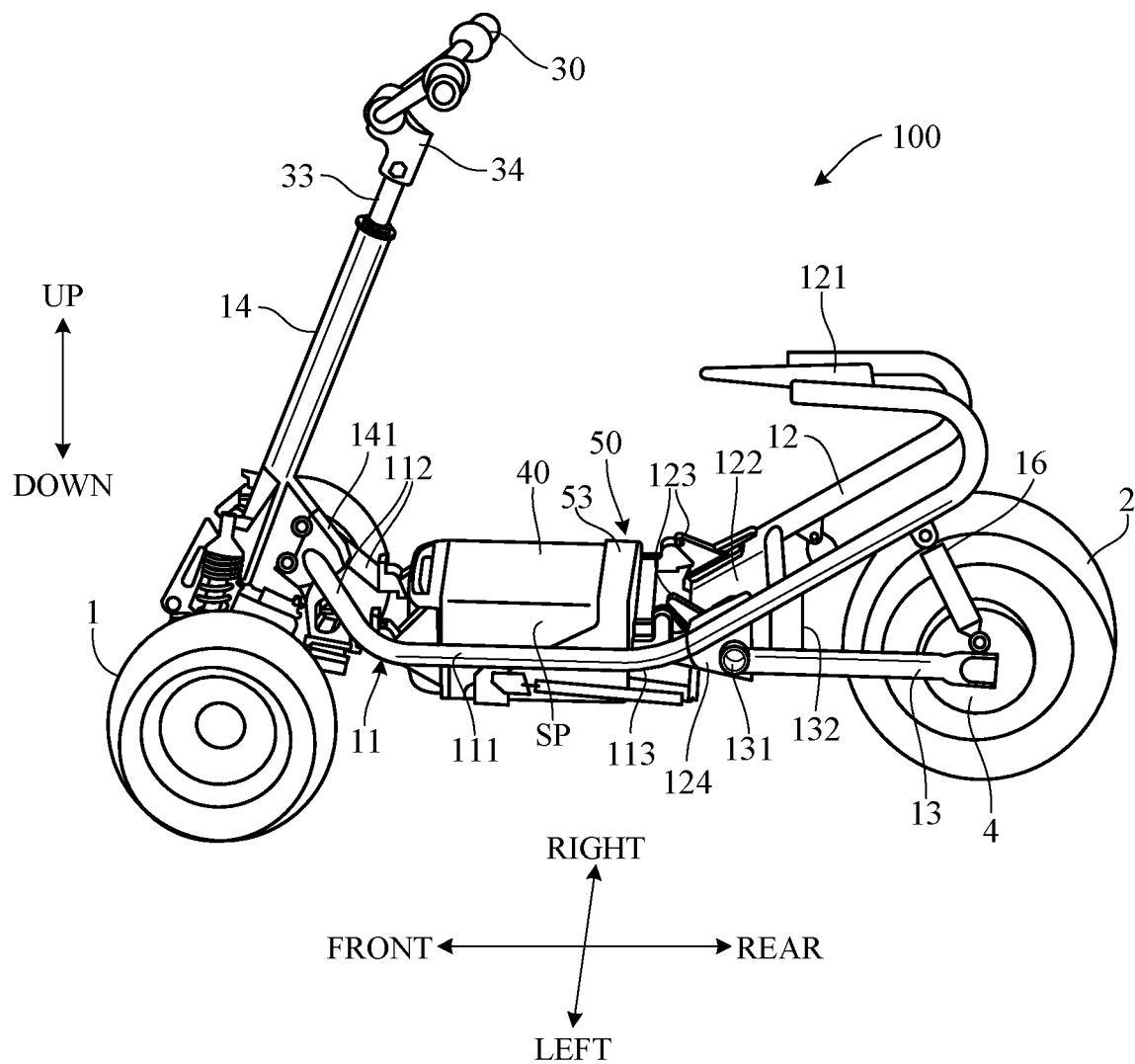
FIG. 2 is a perspective view mainly showing a configuration of a frame of the electric vehicle according to the first embodiment of the present invention.
Figure 3:
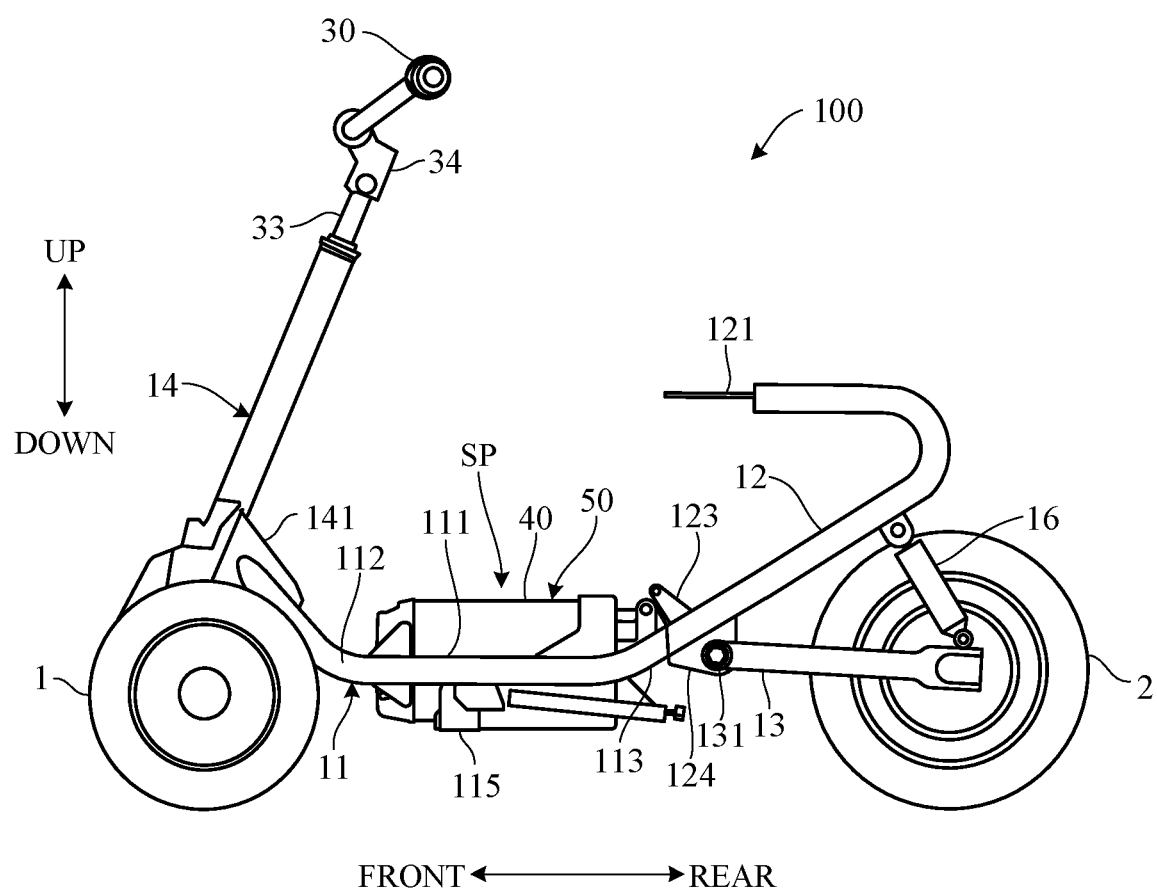
FIG. 3 is a side view mainly showing a configuration of a frame of the electric vehicle according to the first embodiment of the present invention.

FIGS. 2 and 3 are a perspective view and a side view, respectively, of the vehicle 100 showing a state in which the components on the seat 3, cover 20, and handle 30 are removed from the vehicle 100. These drawings mainly show the configuration of the frame 10. As shown in FIGS. 2 and 3, the frame 10 includes the pair of left and right side frames 11 disposed on the central portion in the front-rear direction of the vehicle 100, the seat frames 12 connected to the rear ends of the side frames 11 and extending rearward, a pair of left and right swing arms 13 extending in the front-rear direction below the seat frames 12, and the front frame 14 extending upward from the front ends of the side frames 11. The frame 10 is formed so as to be bilaterally symmetrical.

The left and right side frames 11 consist of, for example, pipe members having an approximately circular section. The left and right side frames 11 each include a horizontal portion 111 extending approximately horizontally in the front-rear direction, a forward inclined portion 112 that is bent from the front end of the horizontal portion 111 and extends inward in the left-right direction and obliquely upward, and a rearward inclined portion 113 that is bent from the rear end of the horizontal portion 111 and extends obliquely upward. A bracket 141 is disposed on the lower end of the front frame 14 so as to protrude rearward. The front ends of the left and right forward inclined portions 112 are fixed to the left and right side surfaces of the bracket 141 by welding or the like.

The battery 40 is housed in the space between the left and right side frames 11 and, more specifically, in the space (housing space SP) inside the left and right horizontal portions 111. That is, the battery 40 is housed in a battery housing apparatus 50 disposed between the left and right side frames 11. The configuration of the battery housing apparatus 50 will be described later.

The seat frames 12 are configured by, for example, a pair of left and right pipe members having an approximately circular section. The front ends of the left and right seat frames 12 are coupled to the rear ends of the left and right side frames 11 (rearward inclined portions 113) by welding or the like. The left and right seat frames 12 extend rearward and upward at the same inclination angle as that of the rearward inclined portions 113, are bent forward and inward in the left-right direction above the rear wheel 2 (above the rotation center), and then integrally connected to each other through a connector 121. The seat 3 is mounted on an upper portion of the connector 121 of the seat frames 12. As shown in FIGS. 1A and 1B, a guide 126 for supporting the buttocks or waist of the user is mounted on a rear portion of the seat 3.

Figure 4:
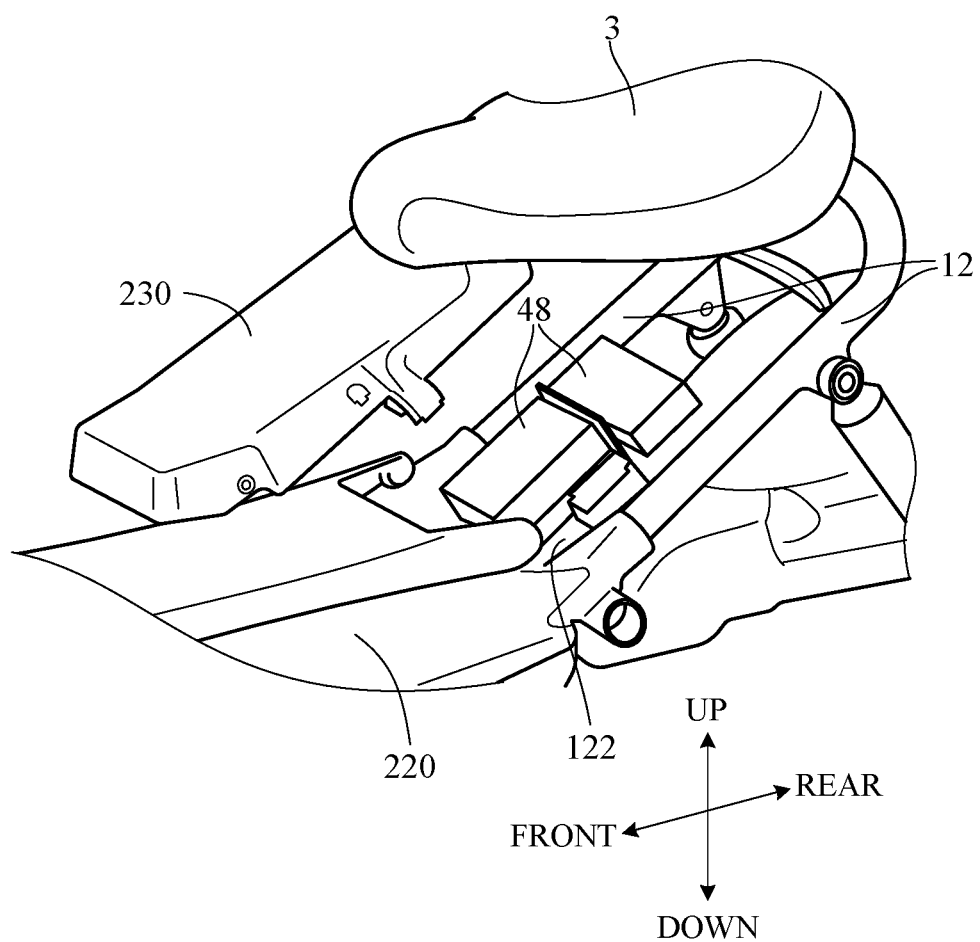
FIG. 4 is a perspective view showing the disposition of electric components mounted on the electric vehicle according to the first embodiment of the present invention.

As shown in FIG. 2, an approximately rectangular plate 122 is disposed between the left and right seat frames 12 in front of the rear wheel 2. The left and right ends of the plate 122 are fixed to the inner surfaces of the left and right seat frames 12 by welding or the like. FIG. 4 is a perspective view showing the disposition of multiple electric components 48 mounted on the plate 122. The electric components 48 include a power control unit, a controller, and the like. The controller controls the operation of the vehicle 100 in accordance with signals from the switches disposed on the handle 30. The power control unit includes an inverter circuit that operates in accordance with control signals outputted from the controller. The power control unit converts the power of the battery 40 into an alternating current and controls the drive of the travel motor 4. The rear cover 230 is mounted so as to cover upper portions of the electric components 48 mounted on the plate 122. For example, the left and right ends of the rear cover 230 are provided with engagement recesses, and the rear cover 230 is mounted by engaging the engagement recesses with the left and right seat frames 12.

As shown in FIGS. 2 and 3, a pair of upper and lower brackets 123 and 124 are disposed on each of the front ends of the left and right seat frames 12 so as to protrude upward and downward, respectively. A lid 51 (to be discussed later) (FIG. 6) is rotatably supported by the upper brackets 123. The front ends of the left and right swing arms 13 are supported by the lower brackets 124 so as to be rotatable using, as pivots, a pair of left and right rotation shafts 131 extending in the left-right direction. The rear ends of the left and right swing arms 13 are rotatably coupled to both ends in the left-right direction of the rotation shaft of the rear wheel 2. As shown in FIG. 2, a plate 132 is fixed to the left and right swing arms 13 in front of the rear wheel 2 by welding or the like, and the left and right swing arms 13 are integrated through the plate 132. An electric component may be disposed on the plate 132. Shock absorption units 16 including coil springs or the like are interposed between the left and right seat frames 12 and left and right swing arms 13.

The lower end of the front frame 14 is fixed to the bracket 141, and the front frame 14 extends upward and rearward (obliquely rearward) from the lower end. A support frame is disposed on the lower end of the front frame 14 so as to protrude in the left-right direction, and the left and right front wheels 1 are rotatably supported by the support frame. The front frame 14 is formed in a pipe shape, and a steering shaft 33 is inserted in the front frame 14 so as to be rotatable with respect to the front frame 14. A stem 34 is mounted on the upper end of the steering shaft 33 using a bolt. The stem 34 is bent upward and forward and formed in an approximately L-shape in a side view.

Figure 5:
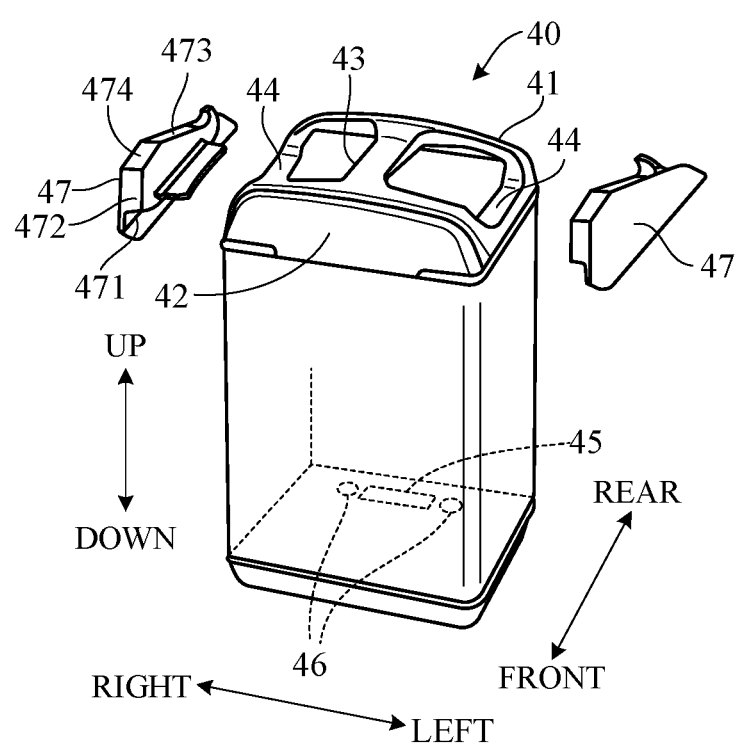
FIG. 5 is a perspective view showing a configuration of a battery mounted on the electric vehicle according to the first embodiment of the present invention.

To improve the removability of the battery 40, the battery housing apparatus 50 according to the present embodiment is configured as follows. First, the configuration of the battery 40 will be described. FIG. 5 is a perspective view of the battery (battery pack) 40. As shown in FIG. 5, the battery 40 takes an approximately rectangular parallelepiped shape and has a predetermined height, width, and thickness. In FIG. 5, the height direction, width direction, and thickness direction of the battery 40 in an erected state are defined as the up-down direction, left-right direction, and front-rear direction. The left-right direction of the battery 40 matches the left-right direction (FIGS. 1A and 1B) of the vehicle 100.

As shown in FIG. 5, the battery 40 is formed such that the height is greater than the width and thickness and the width is greater than the thickness. That is, the battery 40 is formed so as to have a thin, flat external shape. A pair of front and rear protrusions 41 and 42 protruding upward are disposed along the front edge and rear edge, respectively of the upper end of the battery 40. A grip 43 extending in the front-rear direction is disposed between the central portions in the left-right direction of the front and rear protrusions 41 and 42. The grip 43 disposed on the battery 40 allows the user to easily transport the transportable battery 40.

The configuration of the battery 40 as described above makes it easy for the user to remove the battery 40 from the vehicle 100 and to connect the battery 40 to, for example, a charge unit capable of housing the battery 40 in order to charge the battery 40. Also, the battery 40 can be widely used as a power source that supplies power to various electric apparatuses away from the vehicle 100. The rear protrusion 41 is formed in an arm shape (see FIG. 8). Thus, the rear protrusion 41 can also be used as a grip.

An electrode 45 for supplying and discharging power and inputting and outputting signals is disposed on the lower end surface of the battery 40. The electrode 45 is disposed near the rear end of the battery 40 (near the upper end of the battery 40 in FIG. 9A), and approximately circular bottomed holes 46 having a predetermined depth are formed on the left and right sides of the electrode 45. The bottomed holes 46 are used to position the battery 40 on a holder 53 (to be discussed later) (FIG. 10B). Protrusions 44 having a smaller amount of protrusion than the pair of front and rear protrusions 41 and 42 are disposed between the protrusions 41 and 42 on both ends in the left-right direction of the upper surface of the battery 40. Approximately tabular holding fixtures 47 for holding the battery 40 in the housing space SP are mounted on the protrusions 44.

While the battery 40 is made of a metal, the holding fixtures 47 are made of an elastic material (e.g., a hard rubber material, etc.). The holding fixtures 47 take an approximately triangular or trapezoidal shape and each have a bottom 471, front and rear slopes 472 and 473, and a top face 474 between the slopes 472 and 473. The bottom 471 is formed in a concave shape corresponding to the protrusion 44 and is mounted on the protrusion 44 (see FIG. 7). For example, the bottom 471 is fitted to the protrusion 44 by pushing the holding fixtures 47 between the protrusions 41 and 42 while compressing and deforming them. Thus, the holding fixtures 47 are mounted without using fastening means such as bolts. The top faces 474 of the mounted holding fixtures 47 are not horizontal and are gently inclined forward and downward (see FIG. 7).

Figure 6:
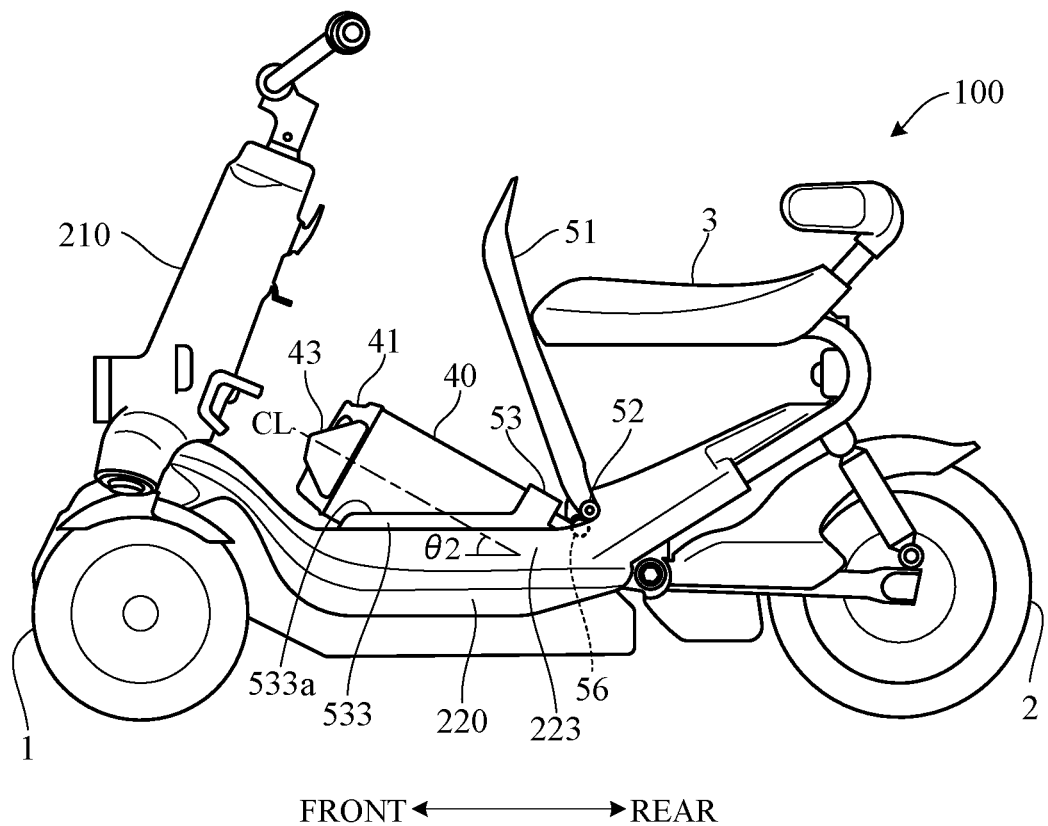
FIG. 6 is a side view showing an example of an operation when the battery mounted on the electric vehicle according to the first embodiment of the present invention is attached and detached.
Figure 7:
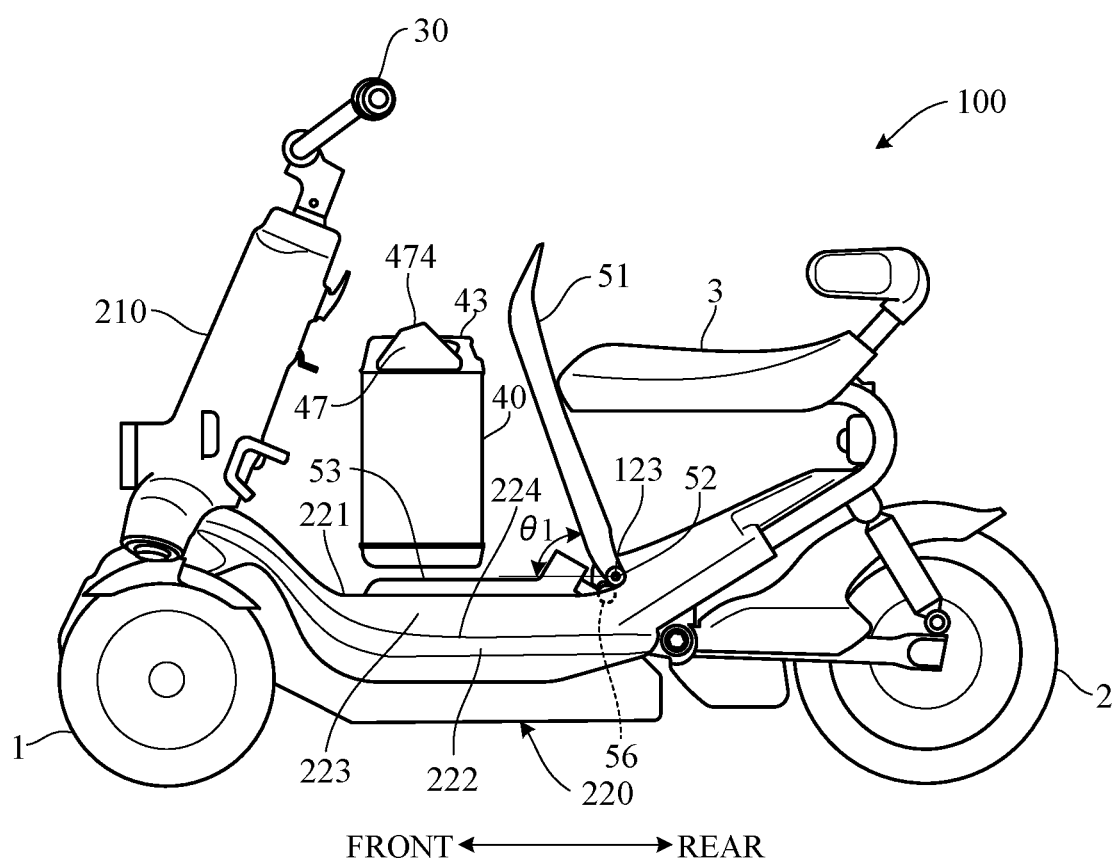
FIG. 7 is a side view showing another example of the operation when the battery mounted on the electric vehicle according to the first embodiment of the present invention is attached and detached.
Figure 8:
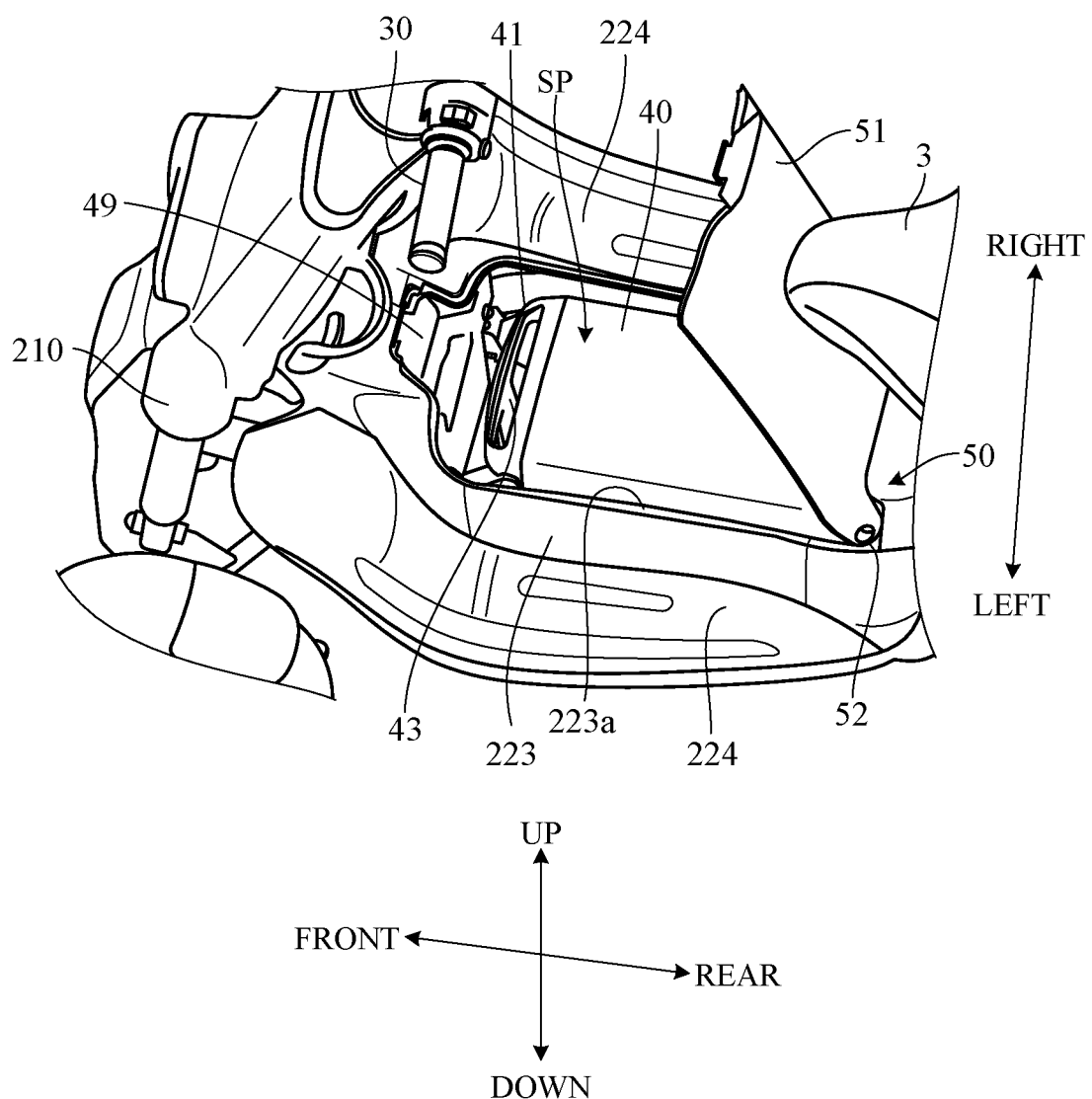
FIG. 8 is a perspective view when a floor cover of the electric vehicle according to the first embodiment of the present invention is seen from an obliquely upward.

FIGS. 6 and 7 are side views showing different operations of the vehicle 100, and FIG. 8 is a top perspective view of the floor cover 220. As shown in FIGS. 6 to 8, the resin lid 51 is disposed on the upper surface of the swelling portion 223 of the floor cover 220 so as to be rotatable using, as pivots, a pair of left and right hinges 52 extending in the left-right direction along an axis (second axis) in the left-right direction. The lid 51 is configured to open and close an approximately rectangular opening 223a of the upper surface of the swelling portion 223. That is, the lid 51 extends in the front-rear and left-right directions so as to cover an upper portion of the housing space SP of the battery 40. The lid 51 is formed in an approximately rectangular shape in a plan view. The hinges 52 are mounted on the brackets 123 (FIG. 2) of the seat frames 12. The rear end of the lid 51 is rotatably supported by the brackets 123 through the hinges 52.

As shown in FIGS. 6 and 7, the hinges 52 are located behind the front end of the seat 3. For this reason, when the rotation angle of the lid 51 with respect to a horizontal line reaches a predetermined angle, the lid 51 contacts the front end of the seat 3. That is, the maximum rotation angle (maximum inclination angle) θ1 of the lid 51 with respect to the horizontal line is limited to 90° or less (e.g., 70°). The hinges 52 are formed as torque hinges, and the lid 51 is held in the open position, in which the lid is open at the maximum inclination angle θ1, by the torque hinges. At this time, there is enough space in the front-rear direction between the lid 51 and front cover 210, and the battery 40 is mounted on or removed from the vehicle 100 through this space.

As shown in FIG. 8, the flat battery 40 is housed so as to be laid in the housing space SP located in front of and below the seat 3, that is, so as to be in a horizontal posture. That is, there is no need to enlarge the housing space SP in the height direction, and the battery 40 is efficiently placed in the relatively wide space inside the left and right steps 224 for placing the legs of the user. Also, since the battery 40 is placed in a low position, the position of the gravity center of the entire vehicle is lowered, resulting in an improvement in the stability of the vehicle 100.

When the battery 40 is housed in the housing space SP, that is, when the battery 40 is located in the housed position, the grip 43 of the upper end of the battery 40 is located on the front side of the vehicle and the protrusion 41 is located on the top side of the vehicle. This allows the user to grasp the grip 43 or protrusion 41 and to lift the battery 40. An engagement mechanism 49 to be engaged with the front end of the lid 51 is disposed at the front end of the housing space SP, and the lid 51 is held in the closed position through the engagement mechanism 49 during travel of the vehicle 100. Note that a lock mechanism for locking the lid 51 in the closed position may be disposed.

Figure 9A:
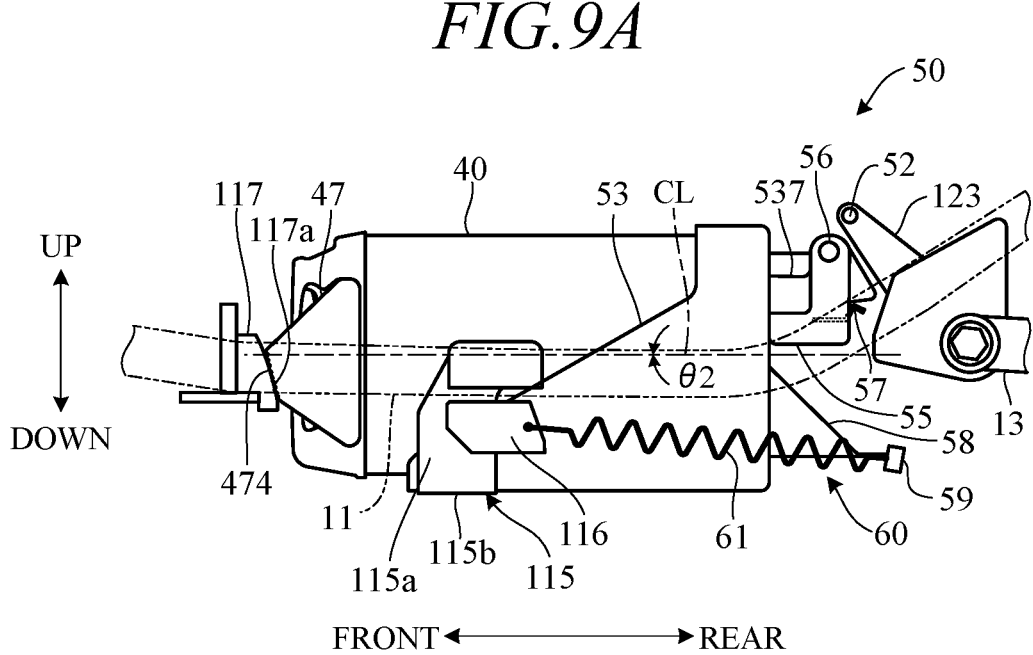
FIG. 9A is a side views showing a configuration of major components of the battery housing apparatus according to the first embodiment of the present invention.
Figure 9B:
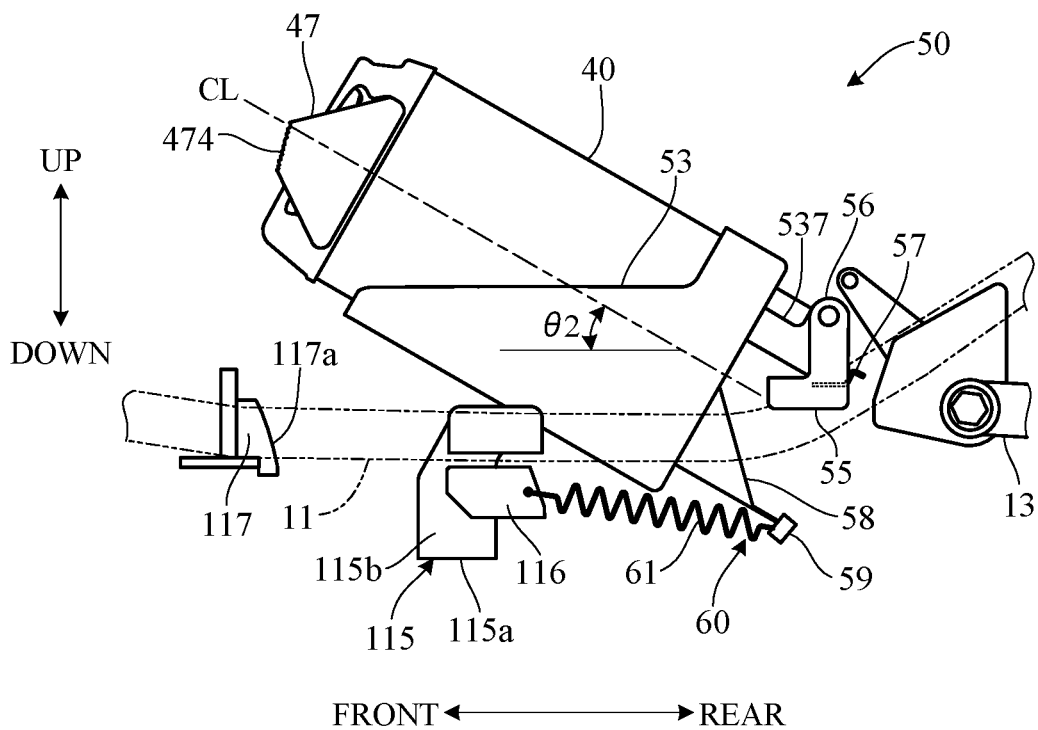
FIG. 9B is a side views showing a configuration of major components of the battery housing apparatus according to the first embodiment of the present invention and showing a different operation from the operation in FIG. 9A.

FIGS. 9A and 9B are side views showing the configuration of major components of the battery housing apparatus 50 according to the first embodiment. FIGS. 9A and 9B show the configuration of components inside the left and right side frames 11, as well as show the side frames 11 using two-dot chain lines for convenience. As shown in FIGS. 9A and 9B, the battery 40 is held by the holder 53 serving as the holding portion and moves to a predetermined position along with the holder 53. That is, the battery 40 is located to the housed position in FIG. 9A and is located in the inserted/removed position (non-housed position) in FIG. 9B. The position of the holder 53 with the battery 40 located in the housed position may be referred to as the horizontal position, and the position of the holder 53 with the battery 40 located in the inserted/removed position as the inclined position.

When the battery 40 is held in the housed position, the battery 40 and holder 53 take a horizontal posture. The horizontal posture refers to, for example, a case in which the center line CL in the thickness direction of the battery 40 extends in the horizontal direction and the angle formed by the center line CL with respect to a horizontal line, that is, the inclination angle θ2 is 0° or approximately 0°. On the other hand, when the battery 40 is held in the inserted/removed position, the battery 40 and holder 53 take an inclined posture. The inclined posture refers to a state in which the angle (inclination angle θ2) formed by the center line CL with respect to the horizontal line is a predetermined angle (e.g., 30°) greater than 0°.

Figure 10A:
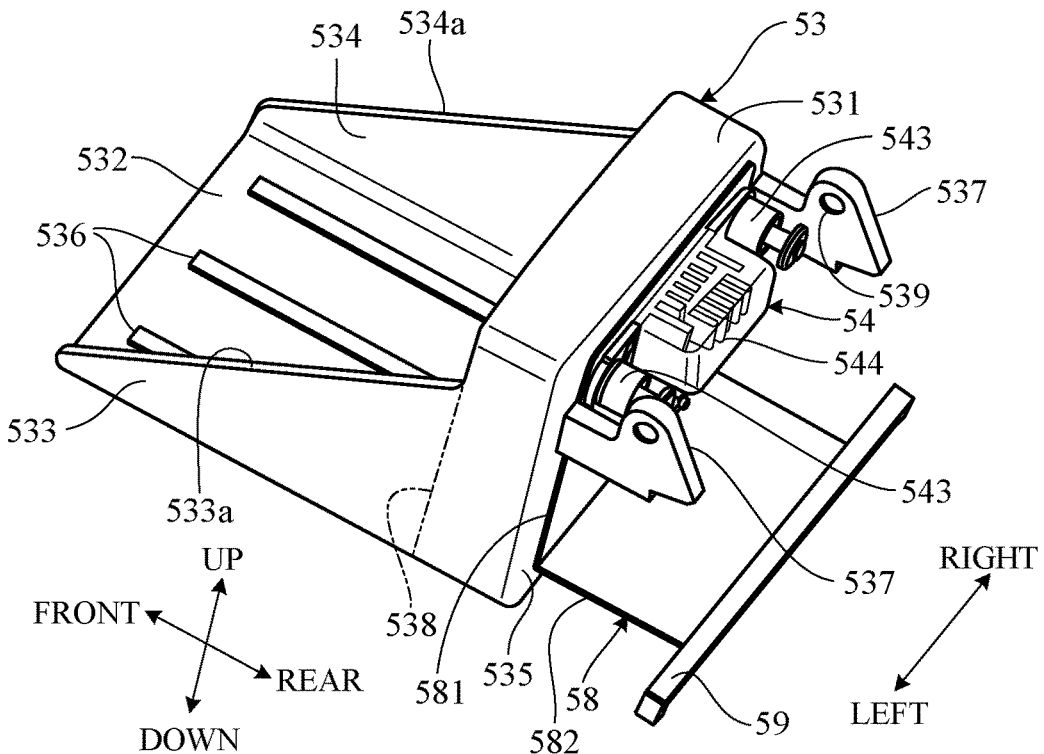
FIG. 10A is a perspective view of a holder included in the battery housing apparatus according to the first embodiment of the present invention.
Figure 10B:
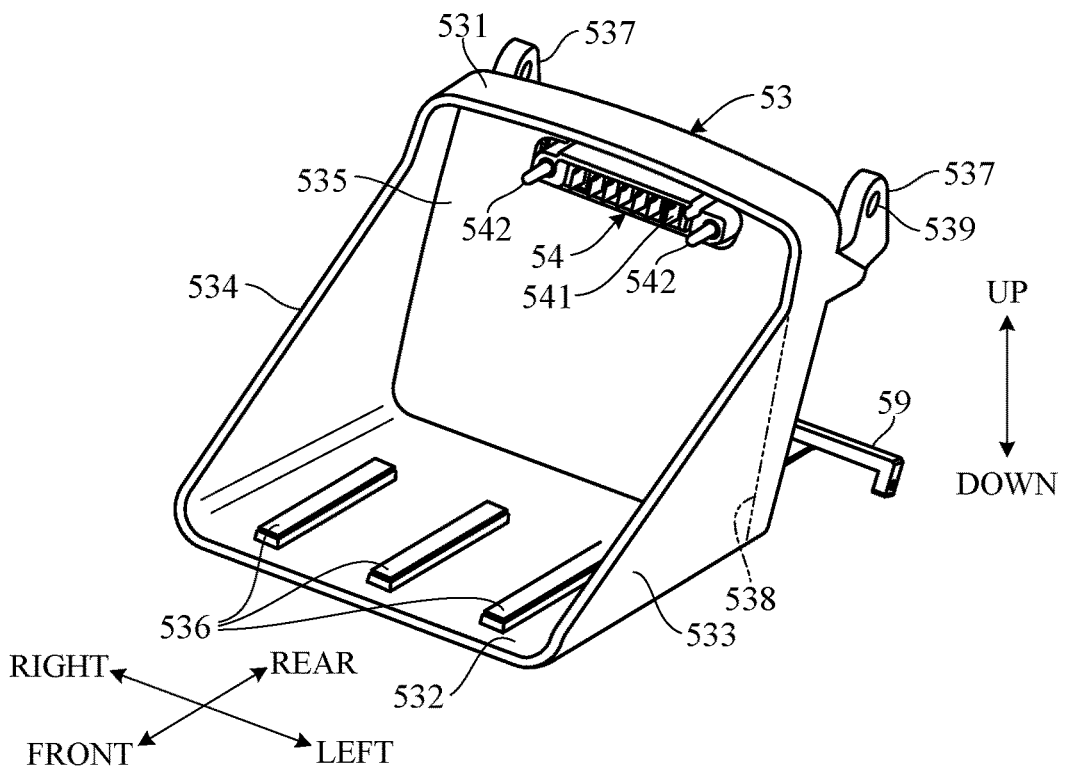
FIG. 10B is a perspective view of the holder included in the battery housing apparatus according to the first embodiment of the present invention, seen from a different direction from FIG. 10A.

FIGS. 10A and 10B are perspective views of the holder 53 seen from different directions. In FIGS. 10A and 10B, the front-rear direction, left-right direction, and up-down direction of the holder 53 are defined so as to correspond to the horizontal posture in FIG. 9A, that is, so as to correspond to the holder 53 in the horizontal position. As shown in FIGS. 10A and 10B, the holder 53 includes a pair of top wall 531 and bottom wall (also referred to as the lower wall) 532, a pair of left and right side walls 533 and 534, and a rear wall 535, and these components are integrally formed using, for example, a resin as a constituent material. That is, the holder 53 consists of the mutually perpendicular multiple tabular members and forms a frame that surrounds a rear portion of the battery 40 and whose front side is open. Among the top wall 531, bottom wall 532, and left and right side walls 533 and 534 of the holder 53, a portion surrounding the entire perimeter of the battery 40 is referred to as a guide ring 538. The guide ring 538 consists of the entire top wall 531, a portion (rear end side) of the bottom wall 532, and portions (rear end side) of the side walls 533 and 534.

The bottom wall 532 protrudes to a more front position than the top wall 531. The side walls 533 and 534 are formed such that upper edges 533a and 534a thereof are inclined rearward and upward from the front end of the bottom wall 532. For this reason, not only the front side but also the top side of the holder 53 is largely open. Thus, as shown in FIG. 9A, when the battery 40 is inserted into the holder 53, the entire rear end of the battery 40 is held by the holder 53. Also, the range of the battery 40 held by the holder 53 is increased as the battery 40 approaches the lower end and rear end of the holder 53. As shown in FIGS. 10A and 10B, multiple (e.g., three) rubber members 536 extending in the front-rear direction are mounted on the upper surface of the bottom wall 532 at equal distances in the left-right direction. By mounting the rubber members 536, the slip resistance of the battery 40 on the bottom wall 532 is increased. Slip tapes may be used in place of the rubber members 536. If the rubber members 536 are changed to slip tapes, the slip resistance is reduced. By selectively using the rubber members and slip tapes in accordance with the rotatable angle of the holder 53, the slip resistance is controlled.

A terminal unit 54 is mounted on an upper portion of the rear wall 535 so as to penetrate the rear wall 535. As shown in FIG. 10B, the terminal unit 54 includes an electrode 541 and a pair of left and right fitting pins 542 disposed on the left and right sides of the electrode 541. The fitting pins 542 protrude forward, are fitted to the bottomed holes 46 (FIG. 5) of the battery 40, and regulate the position of the battery 40. When the fitting pins 542 are fitted to the bottomed holes 46, the electrode 45 on the rear end surface of the battery 40 is connected to the electrode 541 of the terminal unit 54.

As shown in FIG. 10A, the terminal unit 54 is elastically supported by a pair of left and right fixing members 543 including springs so as to be movable in the front-rear direction with respect to the rear wall 535. Thus, a shock caused when the battery 40 collides with the rear wall 535 of the holder 53 is absorbed. Note that a seat material for alleviating a shock caused by insertion of the battery 40 may be mounted on the front surface of the rear wall 535. A terminal 544 connected to the electrode 541 is disposed on the rear end of the terminal unit 54 in a protruding manner, and ends of a power supply/discharge cable (not shown) and a signal line cable (not shown) are connected to the terminal 544. The other ends of the cables are connected to the electric components 48 (FIG. 4) behind the battery 40.

A plate 58 that includes a longitudinal plate 581 extending in the up-down direction and a lateral plate 582 extending rearward from the lower end of the longitudinal plate 581 and has an approximately L-shape section is fitted to the rear surface of the rear wall 535 below the terminal unit 54. The lateral plate 582 of the plate 58 extends rearward above the bottom wall 532, and a rod 59 extending in the left-right direction is fixedly disposed on the rear end of the lateral plate 582. The left and right ends of the rod 59 protrude to more outside positions in the left-right direction than the left and right side walls 533 and 534 of the holder 53. Springs 61 (to be discussed later) are mounted on these protrusions (see FIG. 9A).

A pair of left and right stays 537 are disposed on the left and right sides of the terminal unit 54 on the rear surface of the rear wall 535 so as to protrude rearward. Approximately circular through holes 539 are formed in the left-right direction in the upper ends of the stays 537. As shown in FIG. 9A, approximately L-shaped brackets 55 extending upward and forward are fixed to the left and right inner surfaces of the left and right side frames 11 by welding or the like. The left and right stays 537 of the holder 53 are disposed on the inside in the left-right direction of the left and right brackets 55 so as to be adjacent to the brackets 55. The left and right stays 537 are supported so as to be rotatable using, as pivots, a pair of left and right shafts 56 that penetrate the upper ends of the brackets 55 and the through holes 539, that is, extend along an axis (first axis) in the left-right direction. In other words, the stays 537 are rotatably supported by the side frames 11 through the brackets 55 and shafts 56.

As shown in FIG. 6, the shafts 56 are located in front of the hinges 52 serving as the pivots of the lid 51 and behind the front end of the seat 3. Also, as shown in FIG. 9A, the shafts 56 are located below the hinges 52, and the rear end surfaces of the stays 537 are disposed so as to face the front end surfaces of the brackets 123. More specifically, the front end surfaces of the brackets 123 are formed so as to be inclined forward and upward, and the rear end surfaces (slopes 537d in FIG. 11A) of the stays 537 are correspondingly formed so as to be inclined rearward and downward.

A support plate 115 is disposed between the left and right side frames 11 so as to support the bottom of the holder 53 in the horizontal posture. The support plate 115 is fixed to the left and right inner surfaces of the side frames 11 and includes a pair of left and right (only one is shown) side walls 115a extending downward and a bottom wall 115b extending in the left-right direction so as to connect the lower ends of the pair of left and right side walls 115a. The support plate 115 is formed in an approximately U-shape in a front view. The support plate 115 is formed, for example, by bending a plate member into an approximately U-shape. When the holder 53 is in the horizontal posture, the bottom of the holder 53 is in contact with the upper surface of the bottom wall 115b and thus downward rotation of the holder 53 is restricted. Note that downward rotation of the holder 53 may be restricted by causing the front end surfaces of the approximately L-shaped brackets 55 to contact the rear surface of the holder 53 (rear wall 535).

Leaf springs 57 are fixed to the pair of left and right brackets 55. The leaf springs 57 protrude inward in the left-right direction from the brackets 55, and the upper surfaces thereof are disposed so as to face the bottoms of the stays 537 of the holder 53.

Figure 11A:
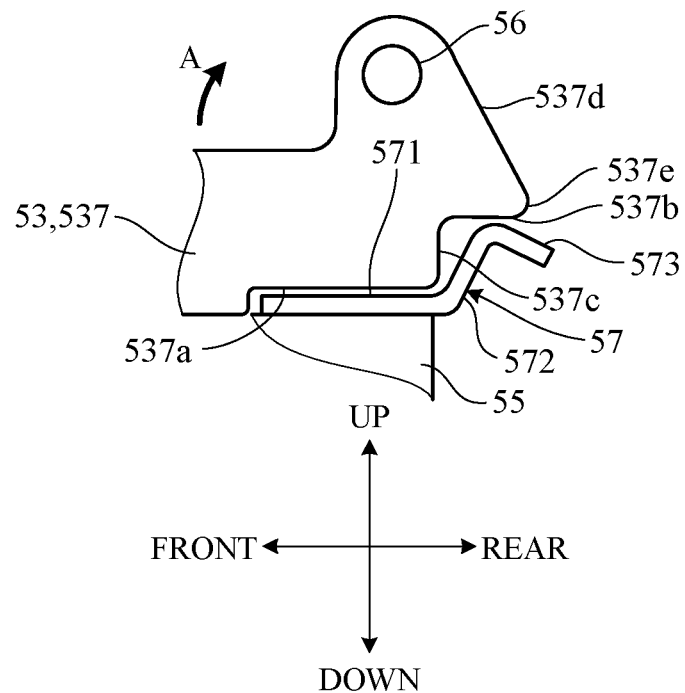
FIG. 11A is a view showing schematically a configuration of a support portion of a holder included in the battery housing apparatus according to the first embodiment of the present invention.
Figure 11B:
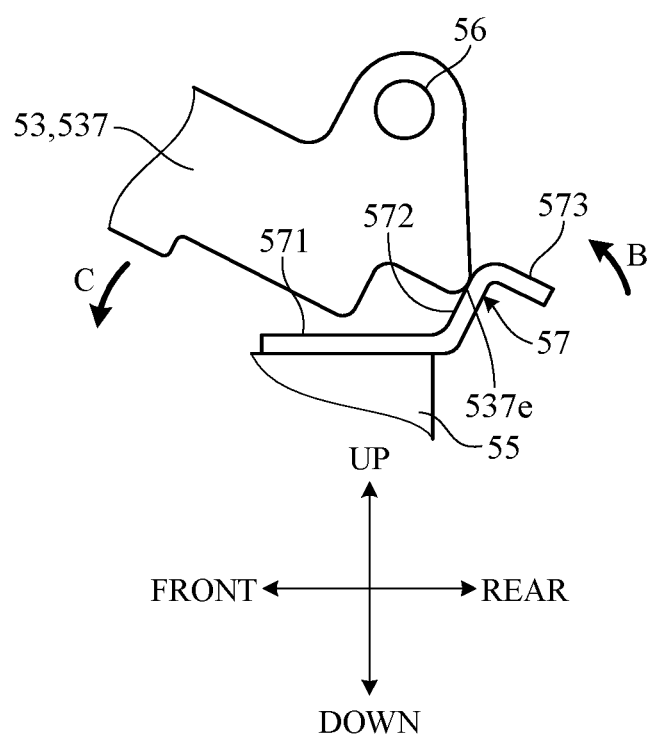
FIG. 11B is a view showing schematically a configuration of a support portion of a holder included in the battery housing apparatus according to the first embodiment of the present invention and showing a different operation from the operation in FIG. 11A.

FIGS. 11A and 11B are drawings schematically showing the configuration of a vertical section passing through the center in the left-right direction of each stay 537. The holder 53 is in the horizontal posture in FIG. 11A and is in the inclined posture in FIG. 11B.

As shown in FIG. 11A, the stays 537 of the holder 53 each include a first bottom 537a extending in the front-rear direction, a second bottom 537b extending in the front-rear direction behind and above the first bottom 537a, a rear end surface 537c connecting the rear end of the first bottom 537a and the front end of the second bottom 537b, and the slope 537d extending forward and upward from the rear end of the second bottom 537b. That is, the bottoms of the stays 537 are formed in a stepped shape. The second bottom 537b and slope 537d cross each other at a corner 537e having an approximately arc-shaped tip.

Each leaf spring 57 is formed by bending a plate having a predetermined thickness into a predetermined shape and includes a base 571 fixed to the corresponding bracket 55, a first plate 572 extending rearward and upward (obliquely upward) from the rear end of the base 571, and a second plate 573 extending rearward and downward (obliquely downward) from the upper end of the first plate 572. That is, the first plate 572 and second plate 573 are formed so as to be cantilever-supported by the base 571 and to be rotatable using the rear end of the base 571 as a pivot due to elastic deformation.

As shown in FIG. 11A, when the holder 53 is in the horizontal posture, the base 571 is located below the first bottom 537a and the first plate 572 and second plate 573 are located in the space below the second bottom 537b and behind the rear end surface 537c. At this time, the leaf spring 57 does not exert a biasing force on the stay 537 of the holder 53. When the holder 53 rotates in the direction of an arrow A in this state, the corner 537e of the stay 537 contacts the upper surface of the second plate 573. Thus, a downward pressing force acts on the leaf spring 57 and bends the leaf spring 57 downward. As the amount of rotation of the holder 53 increases, the contact position of the corner 537e on the second plate 573 moves forward. As shown in FIG. 11B, when the corner 537e moves forward beyond the front end of the second plate 573, the restoring force of the leaf spring 57 acting on the direction of an arrow B blocks rotation in the direction of an arrow C of the holder 53 due to gravity and the holder 53 is held in the inclined posture as the corner 537e being in contact with the first plate 572.

For example, when the battery 40 is removed from the holder 53 and the holder 53 becomes vacant, the leaf springs 57 hold the holder 53 in the inclined posture. On the other hand, when the battery 40, which is a heavy object, is mounted on the holder 53, a rotation force of the battery 40 acting in the direction of the arrow C due to gravity becomes larger than the spring force of the leaf springs 57. Thus, the holder 53 bends the leaf springs 57 downward and rotates in the direction of the arrow C. At this time, a shock caused by the fall of the battery 40 due to gravity is suppressed by a shock absorption mechanism 60 as described below.

As shown in FIG. 9B, the shock absorption mechanism 60 includes the pair of left and right shock absorbing tension springs 61. The springs 61 are, for example, coil springs. The front ends thereof are supported by stays 116 fixed to the side walls 115a of the support plate 115, and the rear ends thereof are supported by the ends of the rod 59 disposed integrally with the holder 53. When the holder 53 moves from the inclined position in FIG. 9B to the horizontal position in FIG. 9A, the springs 61 are extended by a tensile force. Thus, a shock caused when the holder 53 takes a horizontal posture due to the weight of the battery 40 is absorbed. That is, although the biasing force of the springs 61 is smaller than the rotation force of the battery 40 due to gravity, it serves as a resistance force against the rotation force of the battery 40 and thus the shock caused by the rotation of the holder is alleviated.

Battery support portions 117 are fixedly disposed on the inner surfaces of the left and right side frames 11 in front of the support plate 115 so as to correspond to the position of the tip of the housed battery 40. The rear surfaces 117a of the battery support portions 117 are formed in a wedge shape inclined obliquely rearward from the upper end to the lower end so as to correspond to the shape of the top faces 474 of the holding fixtures 47 mounted on the battery 40. Thus, when the holder 53 holding the battery 40 is rotated downward, the top faces 474 of the holding fixtures 47 contact the rear surfaces 117a of the battery support portions 117, as shown in FIG. 9A. As the amount of rotation increases, the holding fixtures 47 are compressed in the front-rear direction and elastically deformed and a pressing force in the front-rear direction from the battery support portions 117 acts on the battery 40 through the holding fixtures 47. Thus, the battery 40 is stably held in the housed posture.

Next, steps for mounting and removing the battery 40 on and from the electric vehicle 100 according to the present embodiment will be described. When removing the battery 40 housed in the housing space SP, first, the opening 223*a* is opened by rotating the lid 51 to a maximum degree using the hinges 52 as pivots, as shown in FIG. 8. At this time, the rotation angle of the lid 51 becomes the maximum inclination angle θ1 (e.g., 70°)(see FIG. 7).

Then, the user inserts an arm between the lid 51 and front cover 210 and grasps the grip 43 or protrusion 41 on the front end of the battery 40 from above. Then, as shown in FIG. 6, the user rotates the holder 53 along with the battery 40 upward using the shafts 56 as pivots. That is, the user lifts the front end of the battery 40 until the inclination angle of the battery 40 and holder 53 becomes θ2 (e.g., 30°) at which they take the inclined posture.

Figure 12:
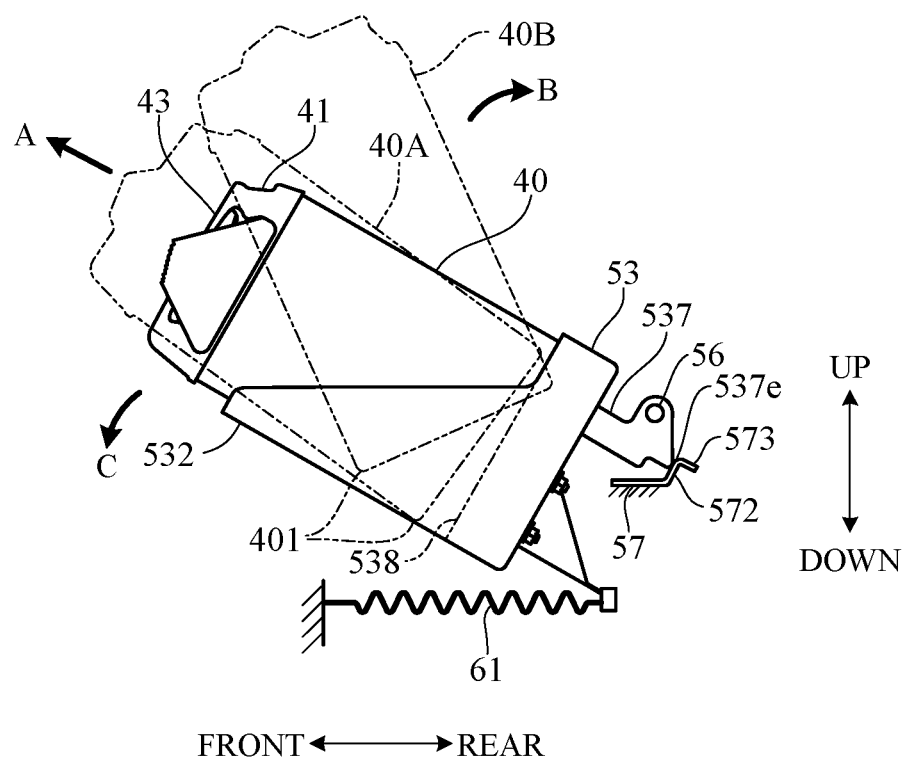
FIG. 12 is a diagram schematically showing an example of a procedure for attaching and detaching the battery using the battery housing apparatus according to the first embodiment of the present invention.

When the holder 53 is in the inclined posture, the leaf springs 57 are pushed downward by the corners 537*e* of the stays 537 of the holder 53, as shown by a solid line in FIG. 12. Thus, the corners 537*e* move beyond the second plates 573 of the leaf springs 57 and contact the first plates 572. Thus, the pressing force of the leaf springs 57 acts on the stays 537 so as to block rotation in the gravity direction (in the direction of the arrow C in FIG. 12) of the battery 40. Thus, the user is able to easily hold the battery 40 in the inclined posture. As shown in FIG. 6, when the battery 40 is in the inclined posture, the height of the edges 533*a* and 534*a* (only the edge 533*a* is shown) of the left and right side walls 533 and 534 of the holder 53 is approximately the same as the height of the upper surface of the floor cover 220, and the edges 533*a* and 534*a* extend approximately horizontally.

Then, the user grasps the grip 43 or protrusion 41, pulls the battery 40 forward (in the direction of the arrow A in FIG. 12), and pulls out the rear end of the battery 40 from the guide ring 538 of the holder 53. The battery 40 in this state is shown by a two-dot chain line 40A in FIG. 12. At this time, the fitting pins 542 (FIG. 10B) of the rear wall 535 of the holder 53 depart from the bottomed holes 46 (FIG. 5) of the bottom of the battery 40. When the battery 40 is pulled out from the guide ring 538, the battery 40 is allowed to rotate relative to the holder 53 using, as a pivot, a corner 401 at which the lower surface and bottom of the battery 40 cross each other.

Then, the user gradually erects the battery 40 on the bottom wall 532 by rotating the battery 40 in the direction of the arrow B in FIG. 12 while causing the corner 401 to slide along the upper surface of the bottom wall 532 of the holder 53. The battery 40 in this state is shown by a two-dot chain line 40B in FIG. 12. When the battery 40 is erected completely, the moment in the C direction of the battery 40 due to gravity is reduced.

Then, the user again grasps, for example, the grip 43 of the battery 40 and lifts the battery 40 upward. Then, as shown in FIG. 7, when the battery 40 completely departs from the holder 53, the user removes the battery 40 from the vehicle 100 by moving the battery 40 between the lid 51 and front cover 210, for example, in the left-right direction. Note that the user may remove the battery 40 by moving the battery 40 upward and passing it through the space between the upper end of the lid 51 and the upper end of the front cover 210. After removing the battery 40, the holder 53 is held in the inclined posture by the leaf springs 57. When connecting the battery 40 removed from the vehicle 100 to, for example, a charge unit or the like capable of housing the battery 40 to charge the battery 40, the user removes the pair of left and right holding fixtures 47 (FIG. 5) from the battery 40.

When mounting the battery 40, the above steps are performed in a reverse order. That is, first, the user grasps the grip 43 of the battery 40 having the holding fixtures 47 mounted thereon and moves the battery 40 to the space above the holder 53, as shown in FIG. 7. Then, as shown in FIG. 12, the user causes the corner 401 of the battery 40 to contact the upper surface of the bottom wall 532 of the holder 53, rotates the battery 40 in the direction of the arrow C (40B→40A) while sliding the corner 401 toward the rear wall 535, and inserts the battery 40 into the guide ring 538 of the holder 53, as shown by the solid line in FIG. 12. Thus, the position of the battery 40 is restricted. When inserting the battery 40 into the guide ring 538, the slip of the battery 40 is suppressed by the rubber members 536 (FIG. 10A) on the upper surface of the bottom wall 532. This suppresses the shock caused when the rear surface of the battery 40 collides with the rear wall 535.

After inserting the battery 40 into the holder 53, the user rotates the battery 40 and holder 53 in the direction of the arrow C by pressing down the front end of the battery 40. Thus, the leaf springs 57 are pushed rearward by the corners 537*e* of the stays 537 and elastically deformed, and the corners 537*e* move to above the second plates 573 of the leaf springs 57 (FIG. 11A). When changing the posture of the holder 53 from the inclined posture to the horizontal posture, the biasing force of the springs acts on the holder 53 so as to suppress downward rotation of the holder 53. This alleviates the shock caused when the battery 40 and holder 53 rotate downward due to gravity.

As shown in FIG. 9A, when the battery 40 takes the horizontal posture and the holding fixtures 47 of the battery 40 contact the battery support portions 117, the user presses down the battery 40 until the bottom of the holder 53 contacts the upper surface of the bottom wall 115*b* of the support plate 115. Thus, the holding fixtures 47, which are elastic bodies, are compressed in the front-rear direction, and the battery 40 is stably held in the housed posture by the pressing force in the front-rear direction through the holding fixtures 47. After housing the battery 40 in the housing space SP, the user closes the lid 51, completing the mounting of the battery 40.

The first embodiment of the present invention produces the following advantageous effects. The vehicle 100 according to the first embodiment includes the battery 40 that supplies power to the travel motor 4, the pair of left and right steps 224 on which a passenger places the left and right legs thereof, and the battery housing apparatus 50 in which the battery 40 is housed in the housing space SP on the inside in the left-right direction of the steps 224 (FIGS. 1A, 8). The battery housing apparatus 50 includes the holder 53 removably holding the battery 40, the openable lid 51 covering the upper portion of the battery 40 housed in the housing space SP, and the shafts 56 extending in the left-right direction and rotatably supporting the holder 53 (FIGS. 7, 9A).

Since the battery 40 is held by the holder 53 disposed so as to be rotatable using the shafts 56 extending in the left-right direction as pivots, the removability of the battery 40 housed in the housing space SP inside the pair of the left and right steps 224 is improved. That is, if the battery 40, which is a heavy object, is disposed in the low position in which the steps 224 are disposed, it is difficult to lift and move the housed battery 40; on the other hand, if the battery 40 is rotatably held through the holder 53, it is easy to lift and move the battery 40. Thus, the battery 40 is easily mounted on and removed from the vehicle 100.

The electric vehicle 100 also includes the seat 3 on which the passenger is seated (FIG. 1A). The shafts 56 of the holder 53 are located behind the foremost portion of the seat 3 (FIG. 7). In such a configuration, the seat 3 is more likely to act as an obstacle and to make it difficult to mount and remove the battery 40. However, in the present embodiment, the battery 40 is rotatably supported through the holder 53 and thus is easily mounted and removed.

The lid 51 is disposed so as to be rotatable using the hinges 52 extending in the left-right direction as pivots, and the hinges 52 are located behind the foremost portion of the seat 3 (FIG. 7). Thus, the housing space SP for the battery 40 can be expanded in the front-rear direction, and the sufficient housing space SP for the large-capacity battery 40 can be ensured.

The shafts 56 of the holder 53 are located above the center line CL passing through the center in the up-down direction of the battery 40 disposed in the housing space SP (FIG. 9A). By locating the shafts 56 above the center line CL as described above, the battery 40 is moved more upward when the holder 53 in the horizontal posture is rotated so as to take the inclined posture. Thus, the battery 40 is easily inserted into and removed from the holder 53.

The holder 53 is rotatably supported by the shafts 56 of the holder 53 between the horizontal position (horizontal posture) in which the holder 53 holds the battery 40 in the housed position and the inclined position (inclined posture) in which the holder 53 holds the battery 40 in the inserted/removed position in which the front end of the battery 40 is located above the rear end thereof (FIGS. 9A, 9B). This allows the user to easily incline the front portion of the battery 40 upward in front of the seat 3, that is, allows the user to easily mount and remove the battery 40 in front of the seat.

The battery housing apparatus 50 also includes the leaf springs 57 that contact the stays 537 of the holder 53 and hold the holder 53 in the inclined position (FIGS. 11A, 11B). Even such a simple configuration easily holds the holder 53 in the inclined posture. The leaf springs 57 are elastically deformed by applying an external force against the biasing force of the leaf springs 57. Thus, the posture of the holder 53 is easily changed from the inclined posture to the horizontal posture. Note that the holding mechanism (non-housing holding mechanism) for holding the holder 53 in the inclined position may be other than the leaf springs 57.

The battery housing apparatus 50 also includes the shock absorption mechanism 60 including the springs (biasing member) 61 that bias the holder 53 toward the inclined posture (FIGS. 9A, 9B). Thus, the shock caused when the battery 40 moves to the housed position is absorbed.

The lid 51 is supported so as to be rotatable from the approximately horizontal closed position to the open position in which the front end of the lid 51 is located above the rear end thereof and the lid 51 is in the predetermined inclined posture (FIGS. 1A and 7). The inclination angle (maximum inclination angle $\theta 1$) of the lid 51 located in the open position with respect to a horizontal line is larger than the inclination angle $\theta 2$ of the holder 53 located in the inclined position with respect to a horizontal line (FIG. 6). When the inclination angle $\theta 2$ is too large, the weight of the battery 40 may directly act on the rear wall 535 of the holder 53 when inserting the battery 40 and the shock is more likely to increase. Since the inclination angle $\theta 2$ is smaller than the inclination angle $\theta 1$, a sufficient work space is ensured during opening of the lid 51 and thus workability is enhanced. The user is allowed to insert the battery 40 taking the inclined posture along the bottom wall 532 of the holder 53 and thus to suppress the shock caused by the insertion of the battery 40.

The holder 53 includes the approximately rectangular rear wall (support wall) 535 on which the shafts 56 serving as the pivots of the holder 53 are disposed and the top wall 531, bottom wall 532, and left and right side walls 533 and 534 that protrude forward from the rear wall 535 and form a frame covering upper, lower, and left and right portions of the battery 40 housed in the housing space SP. The amount of protrusion of the bottom wall 532 is greater than the amount of protrusion of the top wall 531 (FIGS. 9A, 10A). This makes it easy for the user to position and hold the battery 40 on the holder 53, to rotate the battery 40 with respect to the holder 53 on the bottom wall 532, and to insert and remove the battery 40 into and from the guide ring 538.

Figure 13:
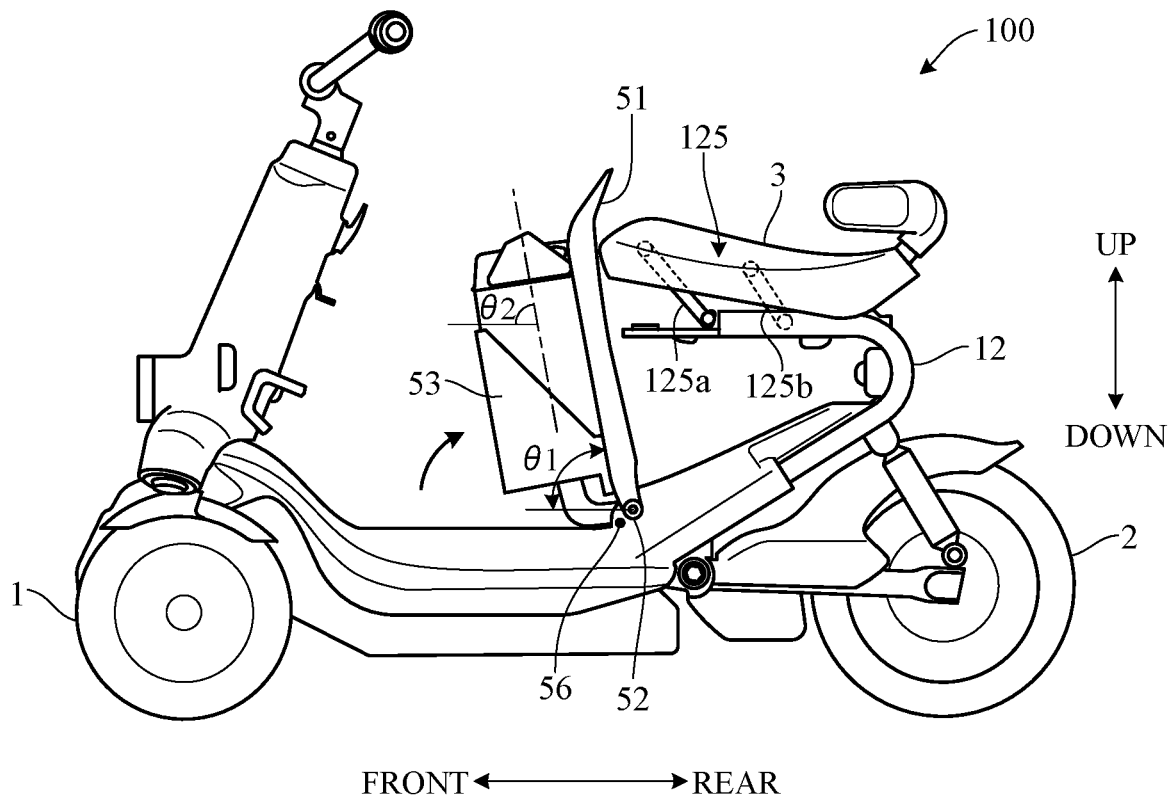
FIG. 13 is a side view of an electric vehicle according to a first modification of the first embodiment of the present invention.
Figure 14:
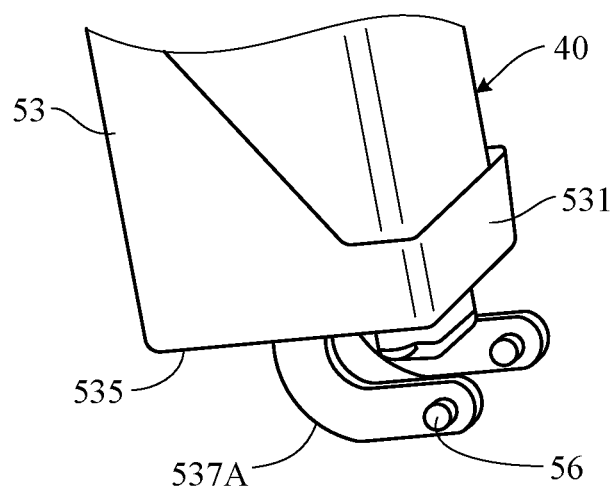
FIG. 14 is an enlarged perspective view sowing a configuration of main components in FIG. 13.

For example, the first embodiment can be modified as follows. FIG. 13 is a side view of an electric vehicle 100 according to a first modification of the first embodiment. FIG. 14 is an enlarged perspective view showing the configuration of the support portion of the holder 53 of the electric vehicle 100. Note that in FIG. 14, some components around the support portion of the holder 53 are not shown for convenience.

As shown in FIG. 13, in the electric vehicle according to the first modification, a seat 3 is supported by seat frames 12 through a link mechanism 125 including a pair of front and rear links 125*a* and 125*b*. Thus, when mounting or removing a battery 40, the seat 3 is moved rearward through the link mechanism 125. As a result, the maximum inclination angle $\theta 1$ of a lid 51 with hinges 52 used as pivots is increased (e.g., increased to about 80°) compared to that in FIG. 7. As shown in FIG. 14, stays 537A protruding rearward from the rear wall 535 of a holder 53 are bent toward the top wall 531 of the holder 53 and formed in an arm shape. The amount of rotation (inclination angle $\theta 2$) of the holder 53 with shafts 56 used as pivots is greater than that in FIG. 6. For example, as shown in FIG. 13, the inclination angle $\theta 2$ is equal to the maximum inclination angle $\theta 1$.

As seen above, the electric vehicle 100 includes the link mechanism 125 that supports the seat 3 such that the seat 3 can move rearward from the seating position in which a passenger is seated. Thus, the maximum inclination angle $\theta 1$ of the lid 51 is increased. The inclination angle $\theta 2$ of the holder 53 is also increased correspondingly. Thus, the battery 40 is held in an approximately upright posture in front of the seat 3, and the removability of the battery 40 is improved. Note that the seating support portion for supporting the seat 3 serving as the seating portion may be other than the link mechanism 125.

Figure 15A:
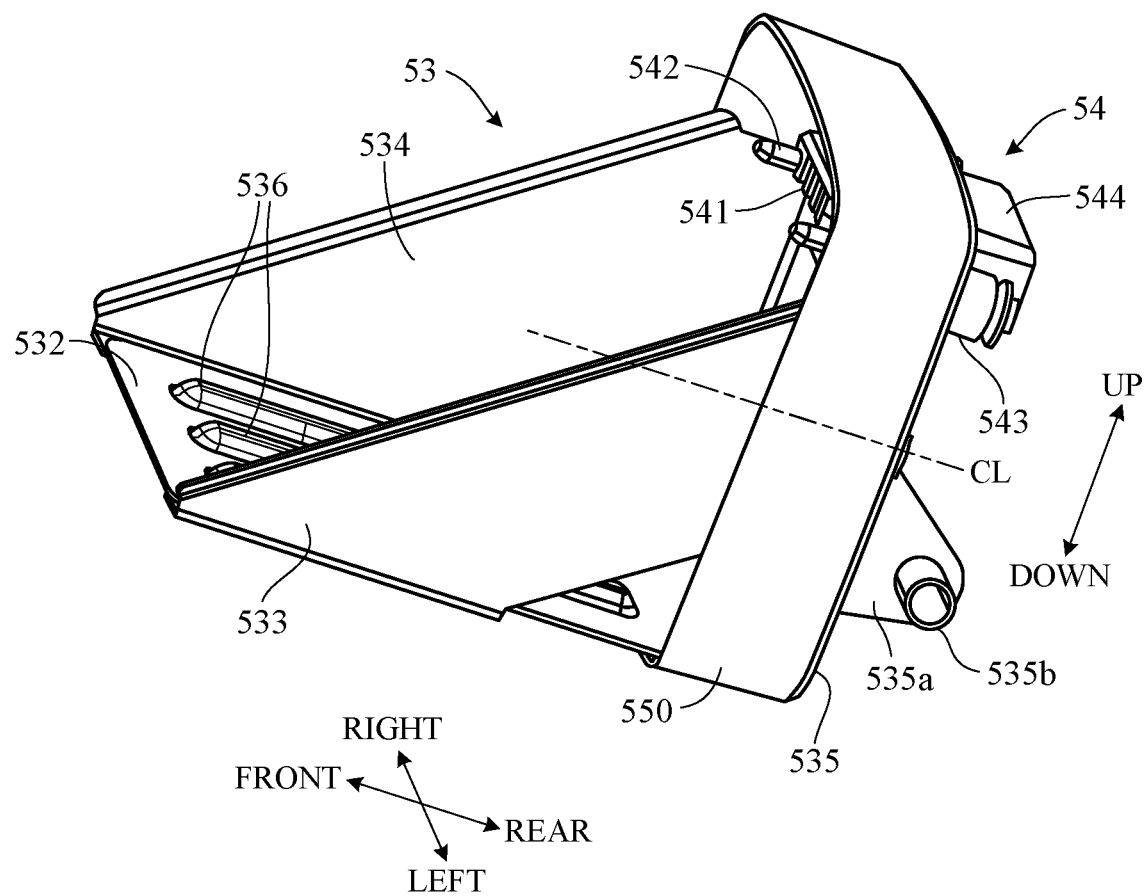
FIG. 15A is a perspective view of the holder included in the battery housing apparatus according to the first modification of the first embodiment of the present invention.
Figure 15B:
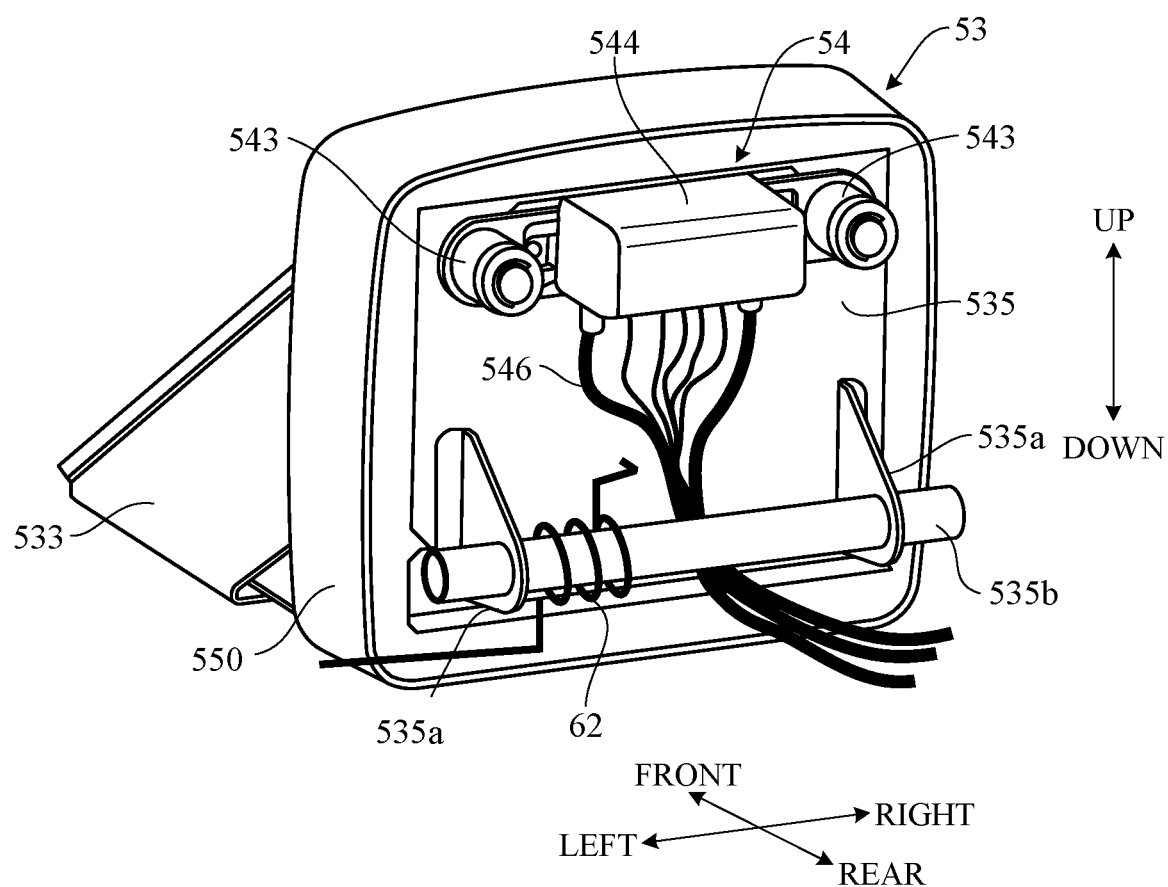
FIG. 15B is a perspective view of the holder included in the battery housing apparatus according to the first modification of the first embodiment of the present invention, seen from a different direction from FIG. 15A.
Figure 16:
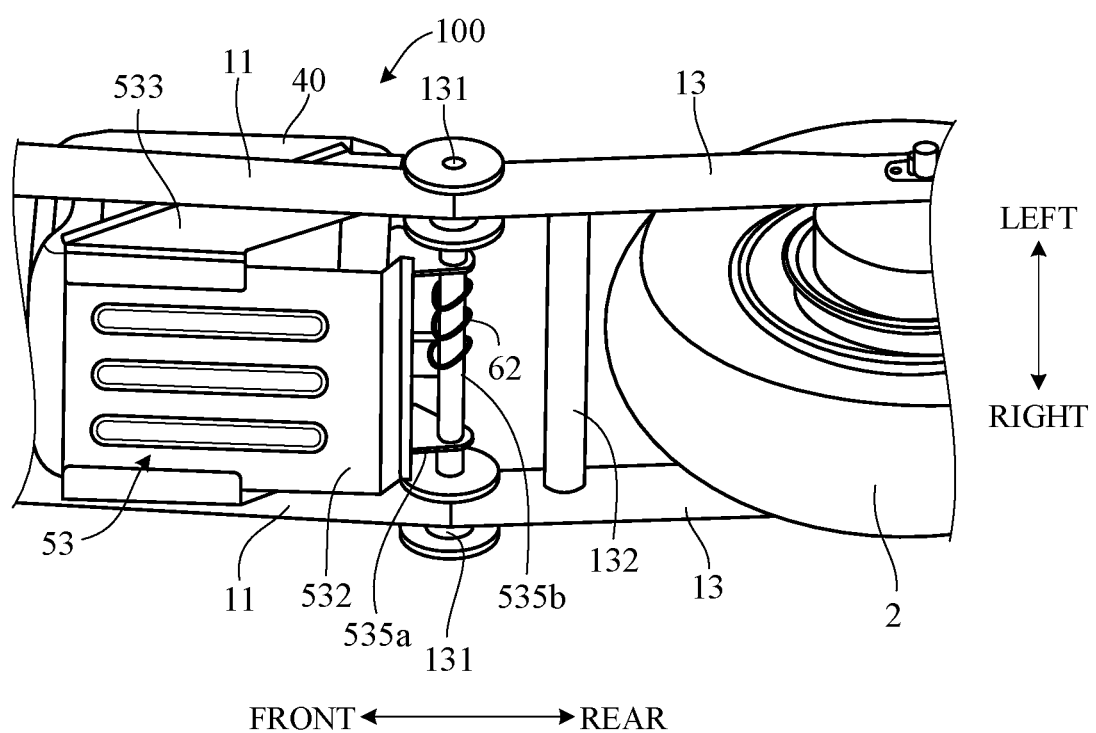
FIG. 16 is a perspective view showing a main configuration of the electric vehicle including the battery housing apparatus according to the first modification of the first embodiment of the present invention.

Referring to FIGS. 15A to 16, a battery housing apparatus according to the first modification of the first embodiment of the present invention will be described. While the first embodiment is configured such that the pivots of the holder 53 are located above the center line CL of the battery 40, the first modification is configured such that the pivot is located below the center line CL.

FIGS. 15A and 15B are perspective views of the holder 53 included in a battery housing apparatus 50 according to the first modification. In FIGS. 15A and 15B, as in FIGS. 10A and 10B, the front-rear direction, left-right direction, and up-down direction of the holder 53 are defined on the basis of the holder 53 in the horizontal posture. In FIGS. 15A and 15B, the same components as those in FIGS. 10A and 10B are given the same reference signs. For convenience, FIG.

15A shows the center line CL of the battery 40 when the battery 40 is held by the holder 53.

As shown in FIGS. 15A and 15B, the holder 53 includes a rectangular frame-shaped guide ring 550 integrally molded using, for example, a resin as a constituent material, and the rear wall 535 is disposed so as to cover the entire rear surface of the guide ring 550. A bottom wall 532 and a pair of left and right side walls 533 and 534 are disposed on the front surface of the rear wall 535 so as to protrude along the inner surface of the guide ring 550. As in the first embodiment, multiple rubber members 536 are mounted on the upper surface of the bottom wall 532 along the front-rear direction at equal distances in the left-right direction. As in the first embodiment, a terminal unit 54 is disposed on an upper portion of the rear wall 535. Although not shown, an approximately rectangular seat material for alleviating a shock caused when the battery 40 is inserted is mounted on the front surface of the rear wall 535 below the terminal unit 54.

As shown in FIG. 15B, a pair of left and right stays 535a are disposed on the rear surface of the rear wall 535 below the center line CL (FIG. 15A) so as to protrude rearward. A cylindrical shaft 535b extending in the left-right direction is disposed integrally with the left and right stays 535a so as to penetrate the stays 535a. The shaft 535b forms the pivot of the holder 53. Cables 546 connected to the terminal 544 are leaded to electric components 48 (FIG. 4) behind the holder 53 through below the shaft 535b. Although not shown, the cables 546 are fixed to the shaft 535b using a fixture. This reduces the load put on the cables 546 during rotation of the holder 53 and prevents damage to the cables 546.

A coiled spring 62 is wound around the shaft 535b. One end of the spring 62 is fixed to the rear wall 535 of the holder 53, and the other end is fixed to a side frame 11 (FIG. 16). The spring 62 is disposed in place of the springs 61 (FIG. 9A) of the shock absorption mechanism 60. When the posture of the holder 53 is changed from the inclined posture to the horizontal posture, the spring 62 gives the holder 53 a biasing force that returns the holder 53 to the inclined posture. Thus, a shock caused when the battery 40 is housed in the housing space SP is alleviated.

FIG. 16 is a perspective view showing the configuration of major components of the vehicle 100 including the battery housing apparatus 50 according to the first modification and is a bottom perspective view of the holder 53. For convenience, FIG. 16 does not show the guide ring 550, rear wall 535, or the like of the holder 53. As shown in FIG. 16, the shaft 535b is disposed on the inside in the left-right direction of a pair of left and right rotation shafts 131 rotatably supporting left and right swing arms 13 so as to be coaxial with the rotation shafts 131. The rotation shafts 131 extend inward in the left-right direction inside the left and right ends surfaces of the shaft 535b, and the left and right ends of the shaft 535b are rotatably supported by the rotation shafts 131. Thus, there is no need to dispose brackets for supporting the shaft 535b, and the configuration is simplified. While the swing arms 13 are coupled to the rear ends of the side frames 11 in FIG. 16, they may be coupled to the front ends of the seat frames 12.

As seen above, in the first modification, the shaft 535b rotatably supporting the holder 53 is located below the center line CL passing through the center in the up-down direction of the battery 40 disposed in the housing space SP (FIG. 15A). Thus, the shaft 535b is allowed to be disposed coaxially with the rotation shafts 131 of the swing arms 13, and the configuration of the support portion of the holder 53 is simplified.

Referring to FIGS. 17A to 18B, a battery housing apparatus according to a second modification of the first embodiment of the present invention will be described. The second modification is configured such that a holder 53 is supported through a link mechanism.

Figure 17A:
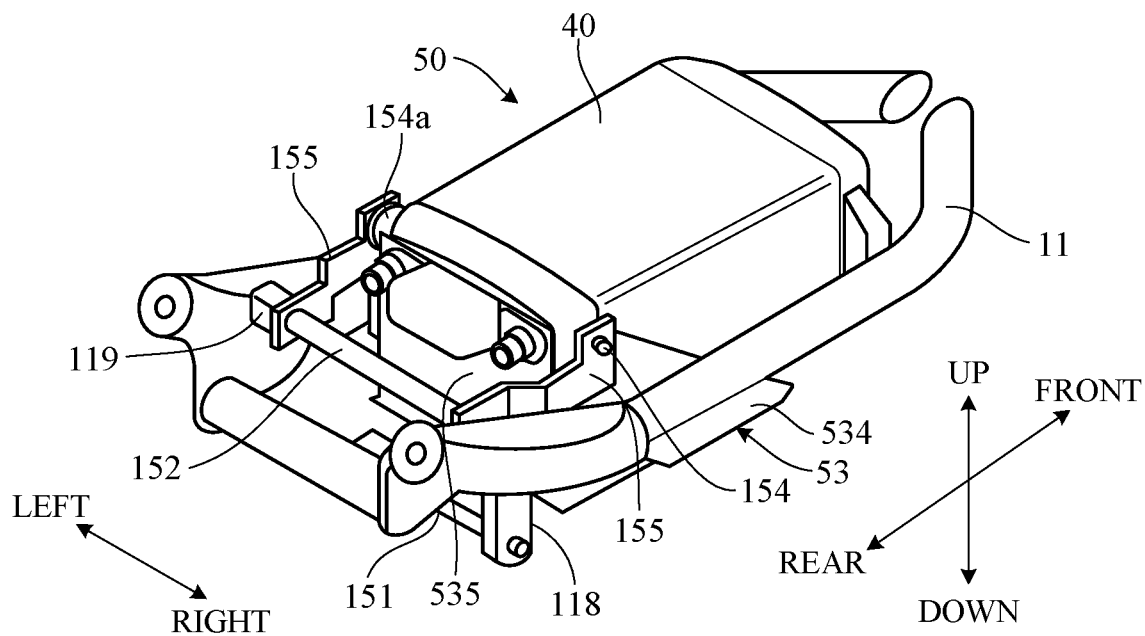
FIG. 17A is a perspective view showing a configuration of a holder and components around the holder included in the battery housing apparatus according to a second modification of the first embodiment of the present invention.
Figure 17B:
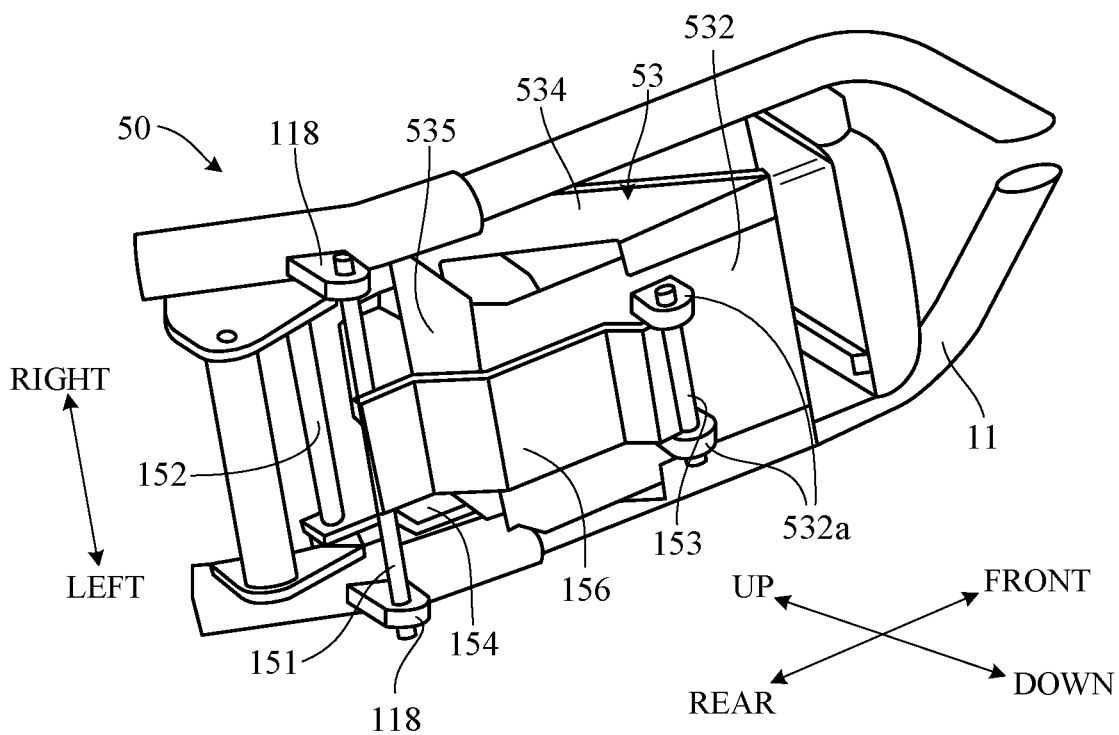
FIG. 17B is a perspective view showing the configuration of the holder and the components around the holder included in the battery housing apparatus according to the second modification of the first embodiment of the present invention, seen from a different direction from FIG. 17A.
Figure 18A:
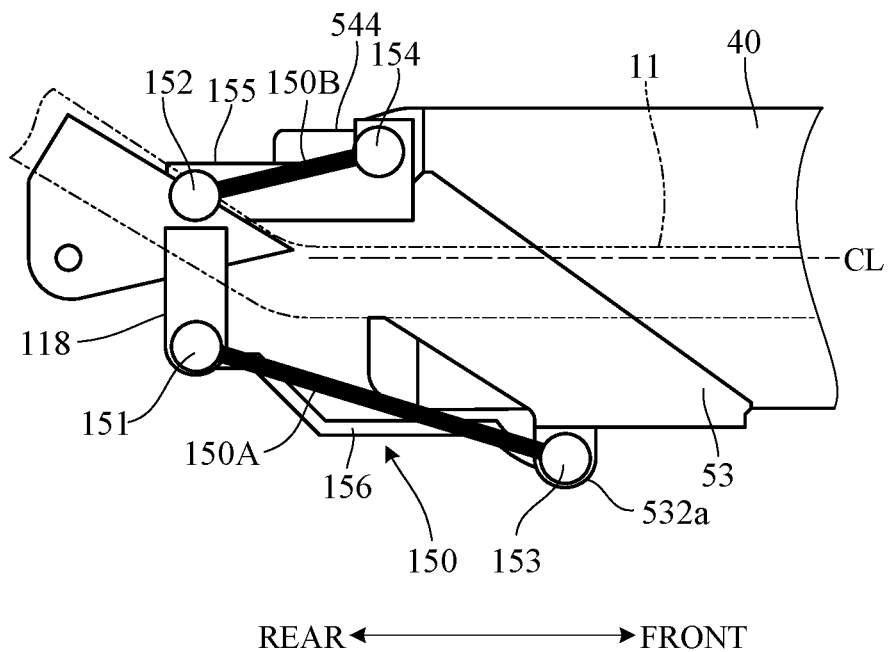
FIG. 18A is a side view of the battery housing apparatus according to the second modification of the first embodiment of the present invention, when the battery is in a horizontal posture.
Figure 18B:
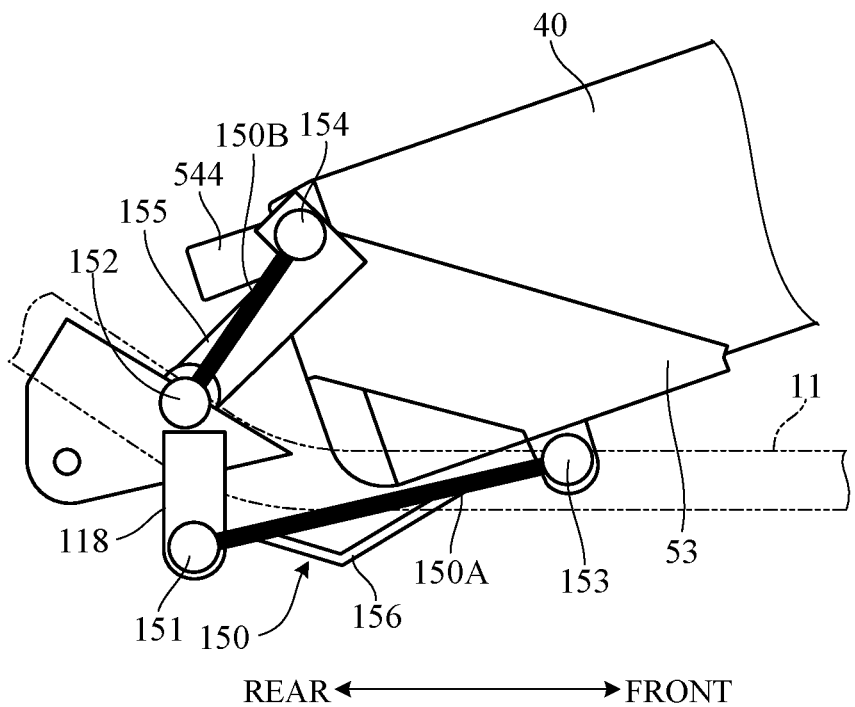
FIG. 18B is a side view of the battery housing apparatus according to the second modification of the first embodiment of the present invention, when the battery is in an inclined posture.

FIGS. 17A and 17B are perspective views showing the configuration of the holder 53 included in a battery housing apparatus 50 according to the second modification and components around the holder 53. FIGS. 18A and 18B are side views. In FIGS. 17A, 17B, 18A, and 18B, the same components as those in FIGS. 15A and 15B are given the same reference signs.

As shown in FIGS. 17A and 17B, a pair of left and right first lower brackets 118 are disposed on the left and right inner surfaces of side frames 11 behind the holder 53 so as to protrude downward, and a first lower rod 151 extending in the left-right direction is supported by the left and right first lower brackets 118. Also, a pair of left and right first upper brackets 119 are disposed on the left and right inner surfaces of the side frames 11 above the first lower brackets 118 so as to protrude upward, and a first upper rod 152 extending in the left-right direction is supported by the left and right first upper brackets 119.

A pair of left and right second lower brackets 532a are disposed on the bottom wall 532 of the holder 53 so as to protrude downward, and a second lower rod 153 extending in the left-right direction is supported by the left and right second lower brackets 532a. A pair of left and right second upper brackets 154a having second upper rods 154 are disposed on the rear ends of the left and right side walls 533 and 534 of the holder 53. Ends of a pair of left and right tabular upper arms 155 are rotatably supported by the left and right second upper rods 154, and the other ends of the upper arms 155 are rotatably supported by the first upper rod 152. Ends of tabular lower arms 156 are rotatably supported by the first lower rod 151, and the other ends of the lower arms 156 are rotatably supported by the second lower rod 153.

The holder 53 is in the horizontal posture (horizontal position) in FIG. 18A and is in the inclined posture (inclined position) in FIG. 18B. As shown in FIGS. 18A and 18B, the lower arms 156 are rotatably supported by the first lower rod 151 and second lower rod 153 and form a first link 150A having a predetermined length. The upper arms 155 are rotatably supported by the first upper rod 152 and second upper rods 154 and forms a second link 150B having a predetermined length. As shown in FIG. 18A, when the holder 53 is in the horizontal position, the first link 150A is located below the center line CL of a battery 40 and the second link 150B is located above the center line CL of the battery 40. The second link 150B is shorter than the first link 150A, and the first link 150A and second link 150B form a link mechanism 150.

As seen above, in the second modification, the holder 53 is supported through the link mechanism 150 having the first link 150A below the center line CL and the second link 150B above the center line CL. Thus, when the holder 53 is rotated from the horizontal posture to the inclined posture using the first lower rod 151 and first upper rod 152 as pivots, the amount of movement of the rear surface of the holder 53 is suppressed with respect to the amount of movement of the bottom surface thereof. This suppresses the load put on cables connected to a terminal 544 and enhances durability.

Second Embodiment

Referring to FIGS. 19 to 23, a second embodiment of the present invention will be described. The difference between the second embodiment and first embodiment will be mainly described below. The second embodiment differs from the first embodiment in the configuration of a holding portion for a battery 40. That is, in the second embodiment, a battery housing apparatus is configured such that a holding mechanism holds the battery 40 in the housed position.

Figure 19:
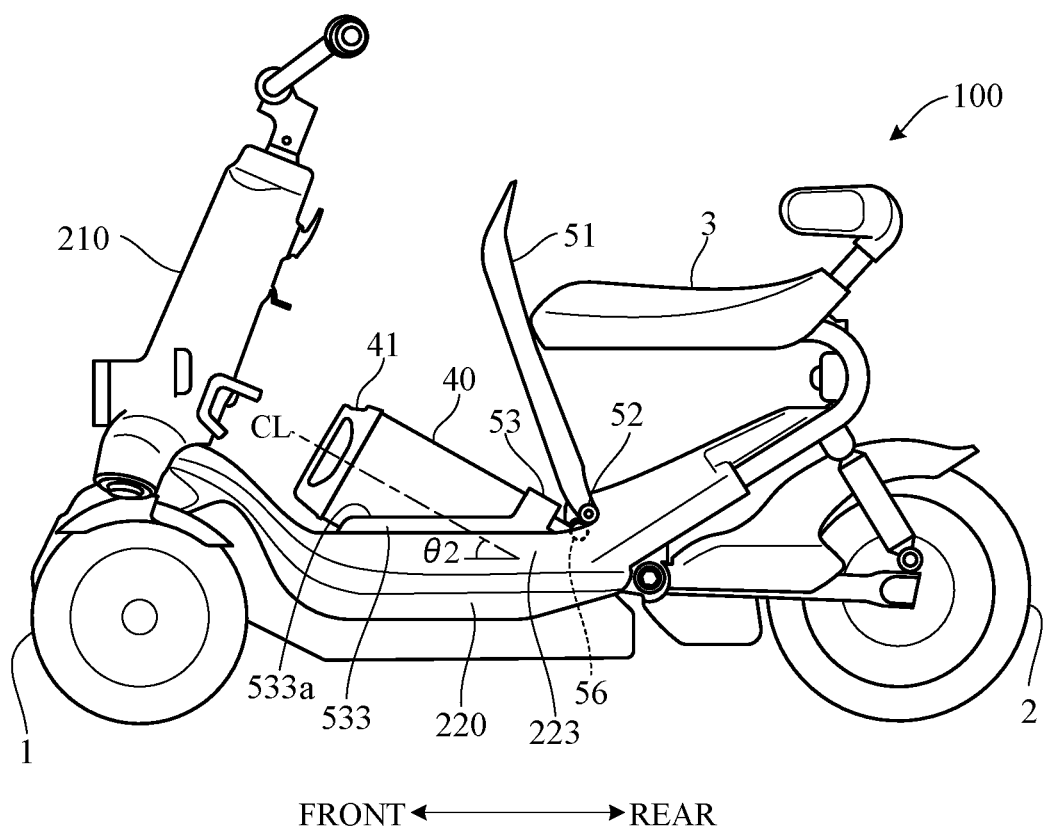
FIG. 19 is a side view showing an example of an operation when the battery is attached and detached by the battery housing apparatus according to the second embodiment of the present invention.
Figure 20:
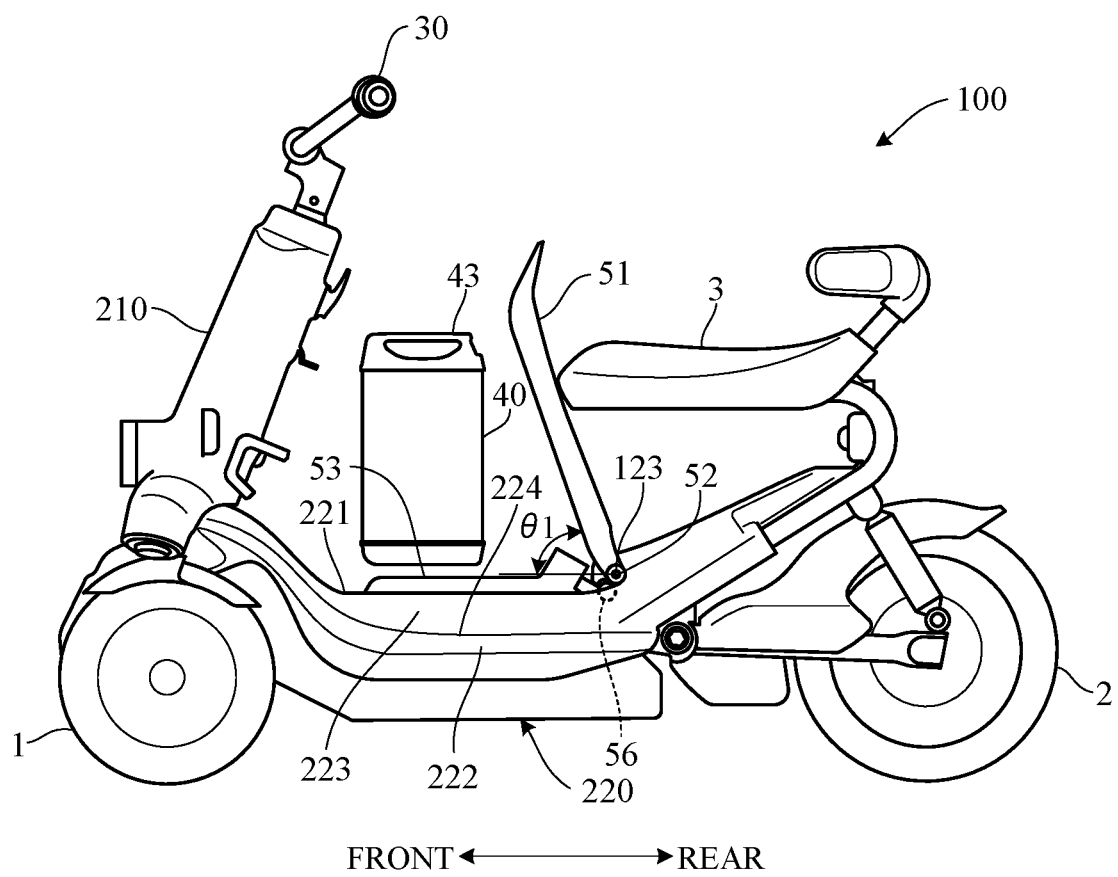
FIG. 20 is a side view showing another example of an operation when the battery is attached and detached by the battery housing apparatus according to the second embodiment of the present invention.

FIGS. 19 and 20 are side views showing an example of operation performed when mounting and removing the battery on and from a vehicle 100 according to the second embodiment. That is, FIG. 19 shows a state in which the battery 40 is held in the inserted/removed position, and FIG. 20 shows a state in which the battery 40 is removed from the vehicle 100. In FIGS. 19 and 20, the same components as those in FIGS. 6 and 7 are given the same reference signs. As shown in FIGS. 19 and 20, in the second embodiment, there is no need to mount holding fixtures 47 (FIG. 5) on the battery 40. This allows the user to instantly connect the battery 40 removed from the electric vehicle 100 to an external charge unit for a charge and to instantly mount the charged battery 40 on the vehicle 100.

Figure 21A:
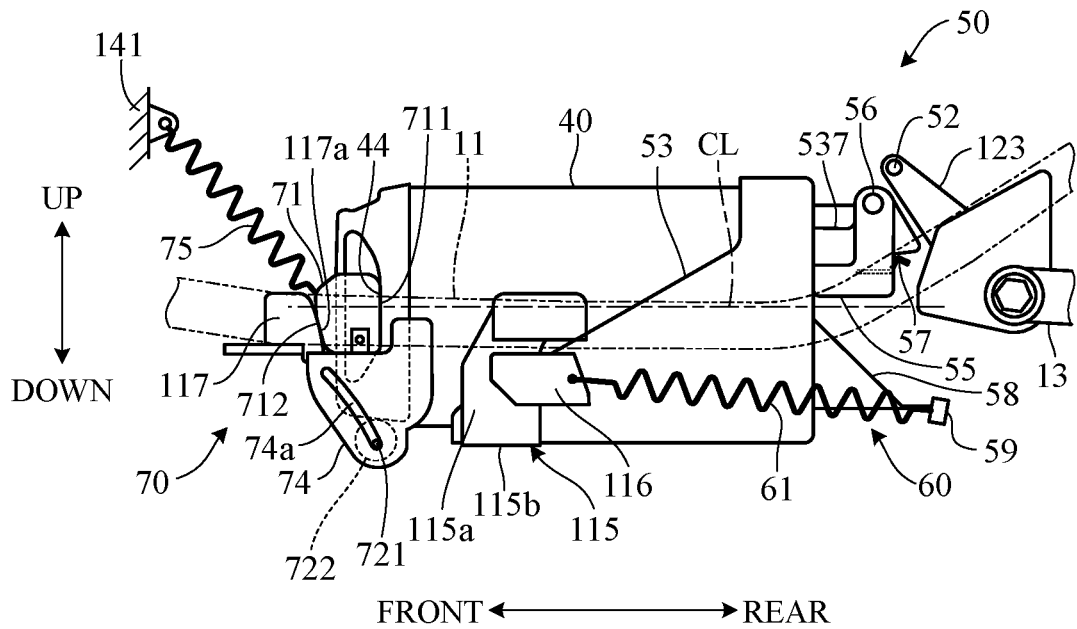
FIG. 21A is a side view showing a configuration of main components of the battery housing apparatus according to the second embodiment of the present invention.
Figure 21B:
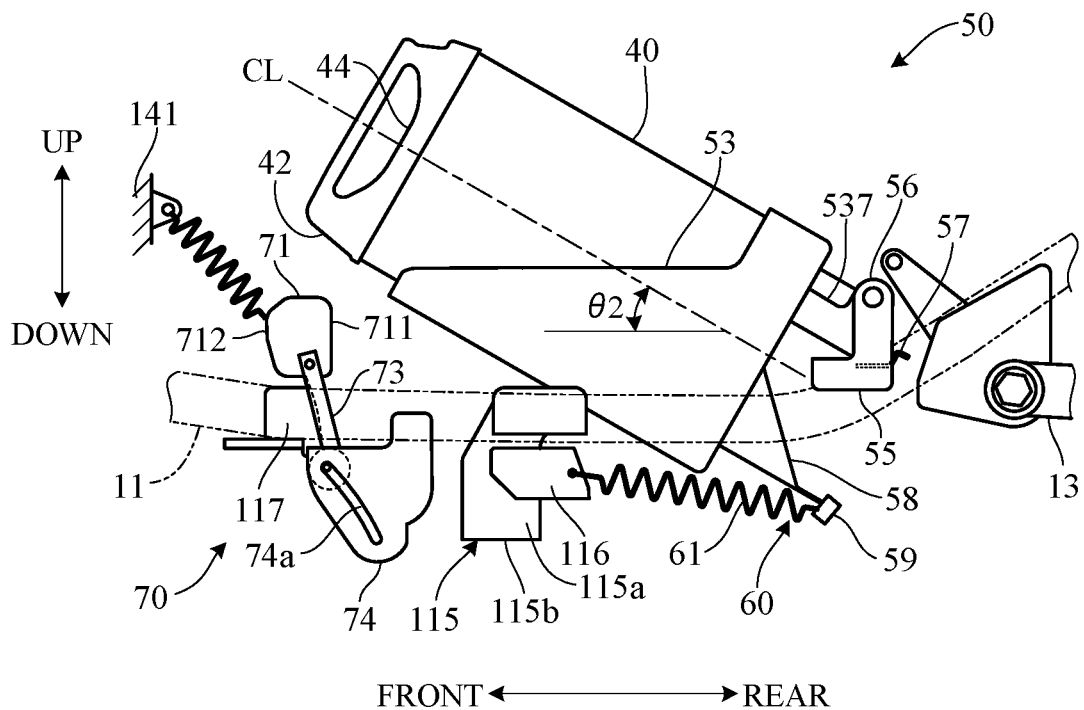
FIG. 21B is a side view showing a configuration of main components of the battery housing apparatus according to the second embodiment of the present invention, seen from a different direction from FIG. 21A.

FIGS. 21A and 21B are side views showing the configuration of major components of a battery housing apparatus 50 according to the second embodiment.

The battery 40 is located to the housed position in FIG. 21A and is located in the inserted/removed position (non-housed position) in FIG. 21B. A holding mechanism 70 is disposed in front of the battery 40. When the battery 40 is located in the housed position, the battery 40 is held in the housed position by the holding mechanism 70. The configuration of the holding mechanism 70 will be described below.

Figure 22A:
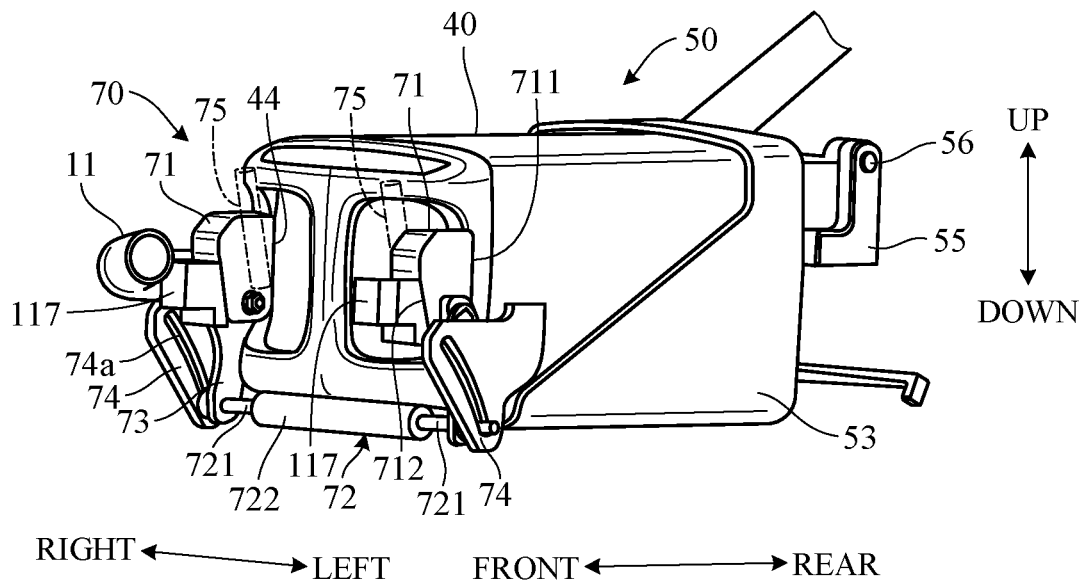
FIG. 22A is a perspective view showing an example of an operation of the battery housing apparatus according to the second embodiment of the present invention.
Figure 22B:
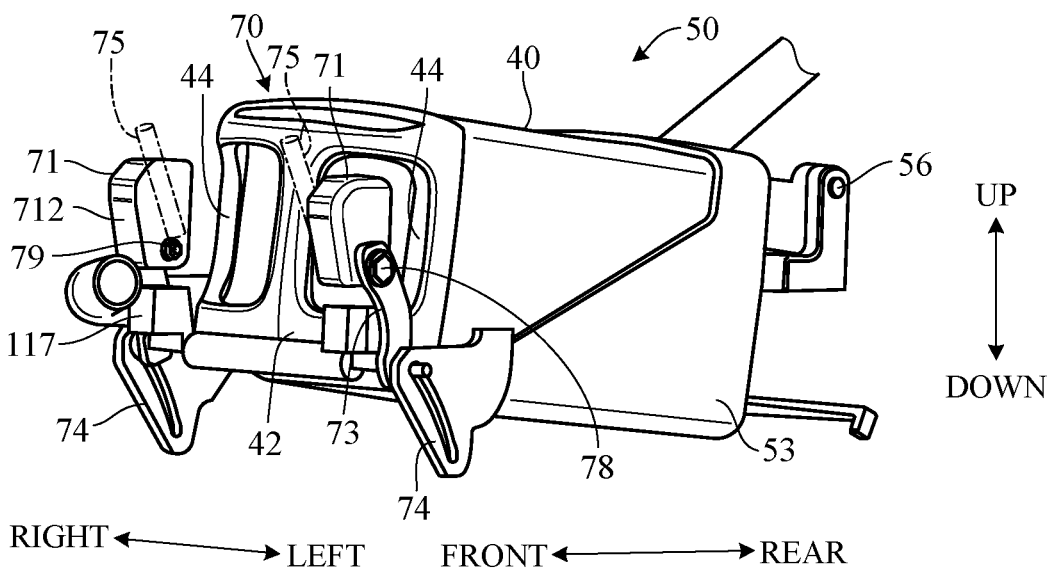
FIG. 22B is a perspective view showing an example of an operation following FIG. 22A.
Figure 22C:
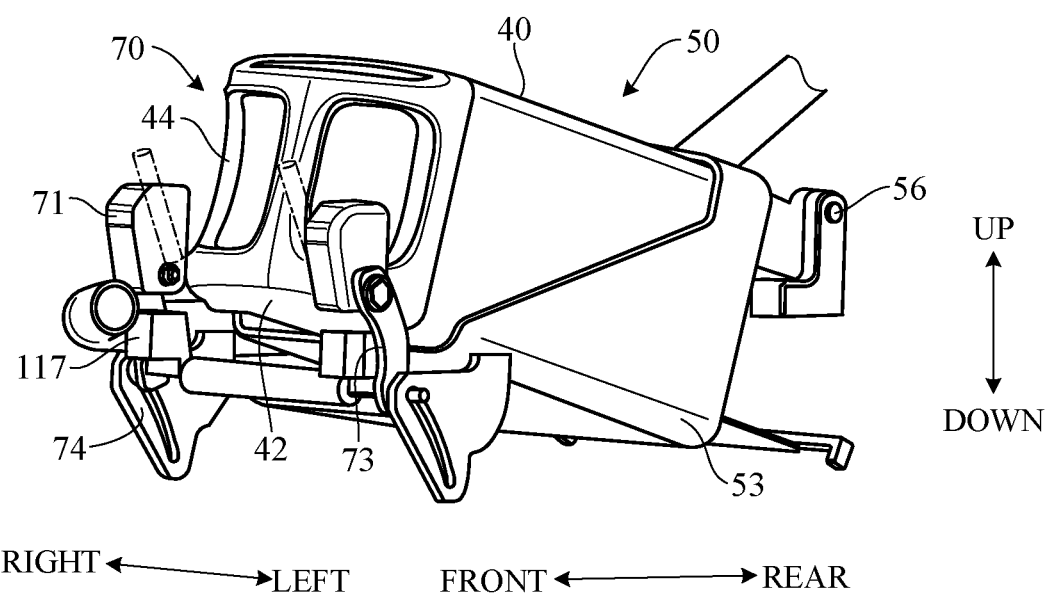
FIG. 22C is a perspective view showing an example of an operation following FIG. 22B.

FIGS. 22A to 22C are front perspective views of the battery housing apparatus 50. FIG. 22A shows a state in which the battery 40 is in the housed position (horizontal posture), FIG. 22C shows a state in which the battery 40 is in the inserted/removed position (inclined posture), and FIG. 22B shows a state in which the battery 40 is in an intermediate position (inclined posture) between the housed position and inserted/removed position. The positions (intermediate position and inserted/removed position) other than the housed position of the battery 40 may be referred to as the non-housed positions. While the inclination angle θ2 with respect to a horizontal line in the inserted/removed position is, for example, 30°, the inclination angle θ2 with respect to the horizontal line in the intermediate position is, for example, 10°. FIGS. 22A to 22C do not show some portions of side frames 11.

As shown in FIGS. 22A to 22C, the holding mechanism 70 includes a pair of left and right movable blocks 71 (pressing portion), a press-down bar 72 (input force portion) extending in the left-right direction, and a pair of left and right coupling plates 73 (coupling portion) that couple the left and right movable blocks 71 and the left and right ends of the press-down bar 72. The movable blocks 71 consist of elastic members (e.g., hard rubber members, etc.). The movable blocks 71 are movably disposed so as to correspond to the positions of the left and right ends (protrusions 44) extending in the up-down direction of the front surface of the battery 40 in the housed position. The movable blocks 71 have a thickness similar to the length in the left-right direction of the protrusions 44 and are formed in an approximately plate shape.

As shown in FIG. 22A, when the battery 40 is located in the housed position, the rear surfaces 711 of the movable blocks 71 take shapes (e.g., partial arc shapes) corresponding to the front surfaces of the protrusions 44 of the battery 40 so as to press the front surfaces of the protrusions 44. The front surfaces 712 of the movable blocks 71 take oblique shapes extending downward and rearward (tapered shapes). As shown in FIG. 21A, a pair of left and right battery support portions 117 are disposed in front of the movable blocks 71.

The left and right battery support portions 117 are fixed to the left and right inner surfaces of the left and right side frames 11. The rear surfaces 117a of the battery support portions 117 are formed in tapered shapes corresponding to the front surfaces 712 of the movable blocks 71 and, more specifically, wedge shapes that are inclined obliquely rearward from the upper end to the lower end. When the battery is housed (FIG. 21A), the movable blocks 71 are disposed between the protrusions 44 of the battery 40 and the battery support portions 117 in a state in which the rear surfaces 711 and front surfaces 712 are in contact with the protrusions 44 and battery support portions 117, respectively, and, more specifically, in a state in which the movable blocks 71 press the battery 40 rearward by elastic deformation. The positions of the movable blocks 71 in this state are referred to as the pressing positions.

As shown in FIG. 22A, a pair of left and right link plates 74 are disposed on the outside in the left-right direction of the movable blocks 71 and coupling plates 73. As shown in FIG. 21A, the link plates 74 are disposed in front of a support plate 115 and behind the battery support portions 117 and are fixed to the inner surfaces of the left and right side frames 11 by welding or the like. Approximately linear or approximately arc-shaped slit holes 74a are formed from the lower end positions to the front upper end positions of the link plates 74.

As shown in FIG. 22A, the press-down bar 72 includes an approximately cylindrical rod 721 extending in the left-right direction and an approximately cylindrical bar member 722 mounted on the rod 721 so as to surround the outer circumferential surface of the central portion in the left-right direction of the rod 721. The left and right ends of the rod 721 are inserted in the slit holes 74a of the link plates 74, and the press-down bar 72 is able to move from the lower end positions in FIG. 22A to the upper end positions in FIGS. 22B and 22C along the slit holes 74a. The bar member 722 is made of, for example, a resin material. In the states of FIGS. 22A and 22B, the bar member 722 is in contact with the bottom of the protrusion 42 of the battery 40.

The left and right coupling plates 73 are movably disposed between the left and right inner surfaces of the left and right link plates 74 and the left and right outer surfaces of the movable blocks 71. The coupling plates 73 extend in the up-down direction and are in an approximately linear shape or approximately arm shape. As shown in FIG. 22B, the upper ends of the coupling plates 73 are coupled to the lower ends of the movable blocks 71 by bolts 78 penetrating the movable blocks 71 in the left-right direction. The lower ends of the coupling plates 73 are coupled to the rod 721 of the press-down bar 72 penetrating the coupling plates 73. Thus, the positions of the coupling plates 73 that are moving are regulated by the link plates 74 serving as the regulation portions through the rod 721.

Tensile springs 75 are disposed on the inside in the left-right direction of the left and right movable blocks 71.

The tensile springs 75 consist of, for example, coil springs, and the lower ends thereof are engaged with the tips of the bolts 78 penetrating the movable blocks 71. Nuts 79 are fastened to the tips of the bolts 78 and thus the tensile springs 75 are engaged between the movable blocks 71 and nuts 79. As shown in FIG. 21A, the other ends of the tensile springs 75 are supported by the bracket 141 of a front frame 14 in front of and above the movable blocks 71. Thus, the movable blocks 71 are always biased forward and upward. Thus, as shown in FIG. 22B or 22C, when the battery 40 is located in the non-housed position, the movable blocks 71 are away from the battery 40. The positions of the movable blocks 71 in this case are referred to as the non-pressing positions.

Next, steps for mounting and removing the battery 40 on and from the electric vehicle 100 according to the present embodiment will be described. When removing the battery 40 housed in the housing space SP, first, an opening 223a is opened by rotating the lid 51 to a maximum degree using hinges 52 as pivots, as in FIG. 8. At this time, the rotation angle of the lid 51 becomes the maximum inclination angle θ1 (e.g., 70°) (see FIG. 20).

Then, the user inserts an arm between the lid 51 and a front cover 210 and grasps a grip 43 or protrusion 41 on the front end of the battery 40 from above. Then, as shown in FIG. 19, the user rotates the holder 53 upward along with the battery 40 using the shafts 56 as pivots. That is, the user lifts the front end of the battery 40 until the inclination angle becomes θ2 (e.g., 30°), at which the battery 40 and holder 53 take the inclined posture.

As the battery 40 is rotated upward, the press-down bar 72 pressed by the housed battery 40 moves upward by the biasing force of the tensile springs 75 through the movable blocks 71 and coupling plates 73. That is, the press-down bar 72 moves from the lower end positions in FIG. 22A to the upper end positions in FIG. 22B along the slit holes 74a of the link plates 74. The movable blocks 71 move upward and forward and depart from the battery 40. Then, as shown in FIG. 22C, when the battery 40 is rotated to the inserted/removed position, the press-down bar 72 is held in the upper end positions of the link plates 74 and departs from the bottom of the battery 40.

Figure 23:
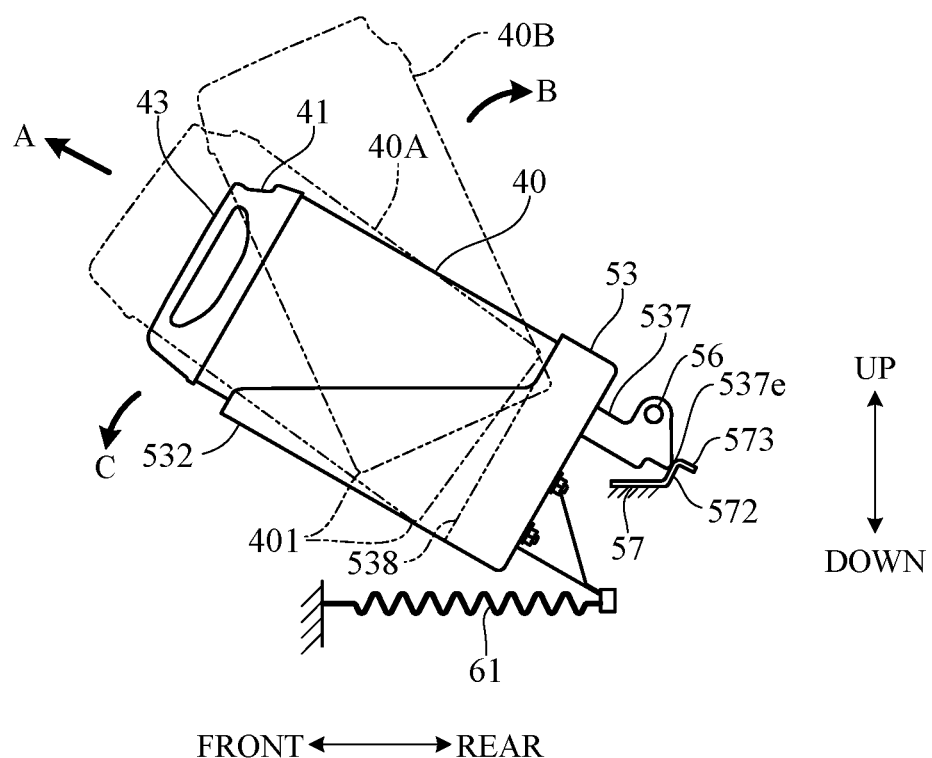
FIG. 23 is a diagram schematically showing an example of a procedure for attaching and detaching the battery by the battery housing apparatus according to the second embodiment of the present invention.

As shown by a solid line in FIG. 23, when the battery 40 is located in the inserted/removed position, leaf springs 57 are pushed downward by the corners 537e of the stays 537 of the holder 53. Thus, the corners 537e move beyond the second plates 573 of the leaf springs 57 and contact first plates 572. Thus, the pressing force of the leaf springs 57 acts on the stays 537 so as to block rotation in the gravity direction (in the direction of the arrow C of FIG. 23) of the battery 40. This allows the user to easily hold the battery 40 in the inclined posture. As shown in FIG. 19, when the battery 40 is in the inclined posture, the height of the edges 533a and 534a (only the edge 533a is shown) of the left and right side walls 533 and 534 of the holder 53 is approximately the same as the height of the upper surface of a floor cover 220 and the edges 533a and 534a extend approximately horizontally.

Then, the user pulls out the rear end of the battery 40 from the guide ring 538 of the holder 53 by grasping the grip 43 or protrusion 41 and pulling the battery 40 forward (in the direction of an arrow A in FIG. 23). The battery 40 in this state is shown by a two-dot chain line 40A in FIG. 13. At this time, the fitting pins 542 (FIG. 10B) of the rear wall 535 of the holder 53 depart from the bottomed holes 46 (FIG. 5) in the bottom of the battery 40. When the battery 40 is pulled out from the guide ring 538, the battery 40 is allowed to rotate relative to the holder 53 using, as a pivot, a corner 401 at which the lower surface and bottom of the battery 40 cross each other.

Then, the user gradually erects the battery 40 on the bottom wall 532 by rotating the battery 40 in the direction of an arrow B in FIG. 23 while causing the corner 401 to slide along the upper surface of the bottom wall 532 of the holder 53. The battery 40 in this state is shown by a two-dot chain line 40B in FIG. 23. When the battery 40 is fully erected, the moment in the C direction in FIG. 23 of the battery 40 due to gravity is reduced.

Then, for example, the user regrasps the grip 43 of the battery 40 and lifts the battery 40 upward. Then, as shown in FIG. 20, in a state in which the battery 40 is completely away from the holder 53, the user removes the battery 40 from the vehicle 100 by moving the battery 40 between the lid 51 and front cover 210, for example, in the left-right direction. Note that the user may remove the battery 40 by moving the battery 40 upward and passing it through the space between the upper end of the lid 51 and the upper end of the front cover 210. After removing the battery 40, the holder 53 remains held in the inclined posture by the leaf springs 57. The battery 40 removed from the vehicle 100 can be charged, for example, by connecting the battery 40 to a charge unit or the like capable of housing the battery 40.

When mounting the battery 40, the above steps are performed in a reverse order. That is, first, the user grasps the grip 43 of the battery 40 and moves the battery 40 to the space above the holder 53, as shown in FIG. 20. Then, as shown in FIG. 23, the user causes the corner 401 of the battery 40 to contact the upper surface of the bottom wall 532 of the holder 53, rotates the battery 40 in the direction of the arrow C (40B→40A) while sliding the corner 401 toward the rear wall 535, and inserts the battery 40 into the guide ring 538 of the holder 53, as shown by a solid line in FIG. 23. Thus, the position of the battery 40 is restricted.

After inserting the battery 40 into the holder 53, the user rotates the battery 40 and holder 53 in the direction of the arrow C in FIG. 23 by pressing down the front end of the battery 40. Thus, the leaf springs 57 are pushed rearward by the corners 537e of the stays 537 and elastically deformed, and the corners 537e move to above the second plates 573 of the leaf springs 57 (FIG. 11A).

When the battery 40 moves from the inserted/removed position (FIG. 22C) to the intermediate position (FIG. 22B), the bottom of the protrusion 42 of the battery 40 contacts the press-down bar 72. Subsequently, the user presses down the battery 40 until the battery 40 reaches the housed position (FIG. 22A), that is, until the bottom of the holder 53 contacts the upper surface of the bottom wall 115b of the support plate 115. Thus, the press-down bar 72 is pressed down by the battery 40. When the press-down bar 72 moves, the front surfaces 712 of the movable blocks 71 contact the rear surfaces of the battery support portions 117.

As shown in FIG. 21A, the movable blocks 71 are pushed between the protrusions 44 of the battery 40 and the battery support portions 117 so as to be formed into a wedge and are compressed in the front-rear direction and elastically deformed.

The movable blocks 71 are kept elastically deformed due to the influence of friction that occurs on the contact surfaces of the protrusions 44 and battery support portions 117. Thus, a pressing force in the front-rear direction from the battery support portions 117 acts on the battery 40 through the movable blocks 71, and the battery 40 is stably held in the housed state. As a result, the connection state of the terminal unit 54 is stably maintained even if a vibration or the like occurs. After housing the battery 40 in the housing space SP, the user closes the lid 51, completing the mounting of the battery 40.

The second embodiment produces the following advantageous effects. The battery housing apparatus 50 includes the frame 10 that forms the housing space SP in which the battery 40 is housed, the holder 53 that holds the battery 40, and the holding mechanism 70 that holds the battery 40 in the housed position in the housing space SP through the holder 53 (FIGS. 2 and 21A). The holder 53 is rotatably supported by the frame 10 (side frames 11) such that the battery 40 moves from the non-housed position (intermediate position, inserted/removed position) in which the battery 40 has yet to be the housed in the housing space SP to the housed position (FIG. 21A). The holding mechanism 70 includes the movable blocks 71 that press the battery 40 located in the housed position, the press-down bar 72 disposed so as to be movable on the movement track of the battery 40 on which the battery 40 moves from the non-housed position to the housed position, and the coupling plates 73 that couple the press-down bar 72 and the movable blocks 71 so that the movable blocks 71 move as the press-down bar 72 moves (FIGS. 22A to 22C).

This configuration allows the movable blocks 71 to move such that the movable blocks 71 press the battery 40 in conjunction with rotation of the battery 40 from the non-housed position to the housed position. Thus, there is no need to perform an operation of holding the battery 40 in the housed position in addition to the operation of housing the battery 40 in the housed position, and the battery 40 is easily mounted on and removed from the vehicle 100.

The holding mechanism 70 also includes the link plates 74 provided with the slit holes 74a that regulate movement of the coupling plates 73 so that the movable blocks 71 move from the non-pressing positions to the pressing positions when the battery 40 moves from the non-housed position to the housed position (FIGS. 22A to 22C). Thus, the movable blocks 71 are favorably moved to predetermined positions in conjunction with rotation of the battery 40.

The movable blocks 71 have the rear surfaces 711 formed so as to correspond to the protrusions 44 of the battery 40 (FIG. 22A). The link plates 74 regulate movement of the coupling plates 73 so that the movable blocks 71 retreat forward from the movement track of the battery 40 when the battery 40 is located in the non-housed position and, on the other hand, the rear surfaces 711 of the movable blocks 71 press the protrusions 44 of the battery 40 rearward when the battery 40 is located in the housed position (FIGS. 22A to 22C). Thus, when housing the battery 40, the movable blocks 71 do not block movement of the battery 40 and the positions of the movable blocks 71 are optimally regulated.

The frame 10 includes the battery support portions 117 disposed so as to face the protrusions 44 of the battery 40 (FIG. 21B). When the battery 40 moves from the non-housed position to the housed position, the link plates 74 regulate movement of the coupling plates 73 so that the movable blocks 71 are pressed between the battery support portions 117 and protrusions 44 (FIGS. 21A, 21B). This allows the battery support portions 117 to apply a pressing force to the battery 40 rearward through the movable blocks 71 so that the battery 40 is stably held in the housed position.

The holding mechanism 70 also includes the tensile springs 75 that bias the movable blocks 71 toward the non-pressing positions (FIG. 21A). This allows the movable blocks 71 to easily retreat to the non-pressing positions when the battery 40 moves from the housed position to the non-housed position.

The press-down bar 72 is disposed below the battery 40 so as to be pushed by the battery 40 when the battery 40 moves from the non-housed position to the housed position (FIGS. 22A to 22C). Thus, the force applied by the user to press the battery 40 is easily inputted to the press-down bar 72, resulting in smooth movement of the movable blocks 71.

The battery housing apparatus 50 also includes the terminal unit 54 connected to the battery 40 (FIG. 10A). The movable blocks 71 are configured to press the battery 40 located in the housed position toward the terminal unit 54 (FIG. 21A). Thus, the connection between the battery 40 and terminal unit 54 are stably maintained.

The battery housing apparatus 50 also includes the support portions for the holder 53 disposed on the frame 10 of the vehicle 100, that is, the brackets 55 and shafts 56 that rotatably support the holder 53 such that the holder 53 takes the horizontal posture or approximately horizontal posture when the battery 40 is located in the housed position and takes the inclined posture when the battery 40 is located in the non-housed position.

Thus, the center of gravity of the vehicle 100 with the battery 40 located in the housed position is lowered. Also, the battery 40 in the inclined posture is inserted and removed in the non-housed position. Therefore, the battery 40 is easily mounted on and removed from the vehicle 100.

For example, the second embodiment can be modified as follows. Referring to FIGS. 24A to 28, a modification of the battery housing apparatus according to the second embodiment of the present invention will be described. While the second embodiment is configured such that the battery 40 is held by pressing the movable blocks 71 in the shape of a wedge between the battery 40 and battery support portions 117, the modification is configured such that a battery 40 is held through a lock mechanism.

Figure 24A:
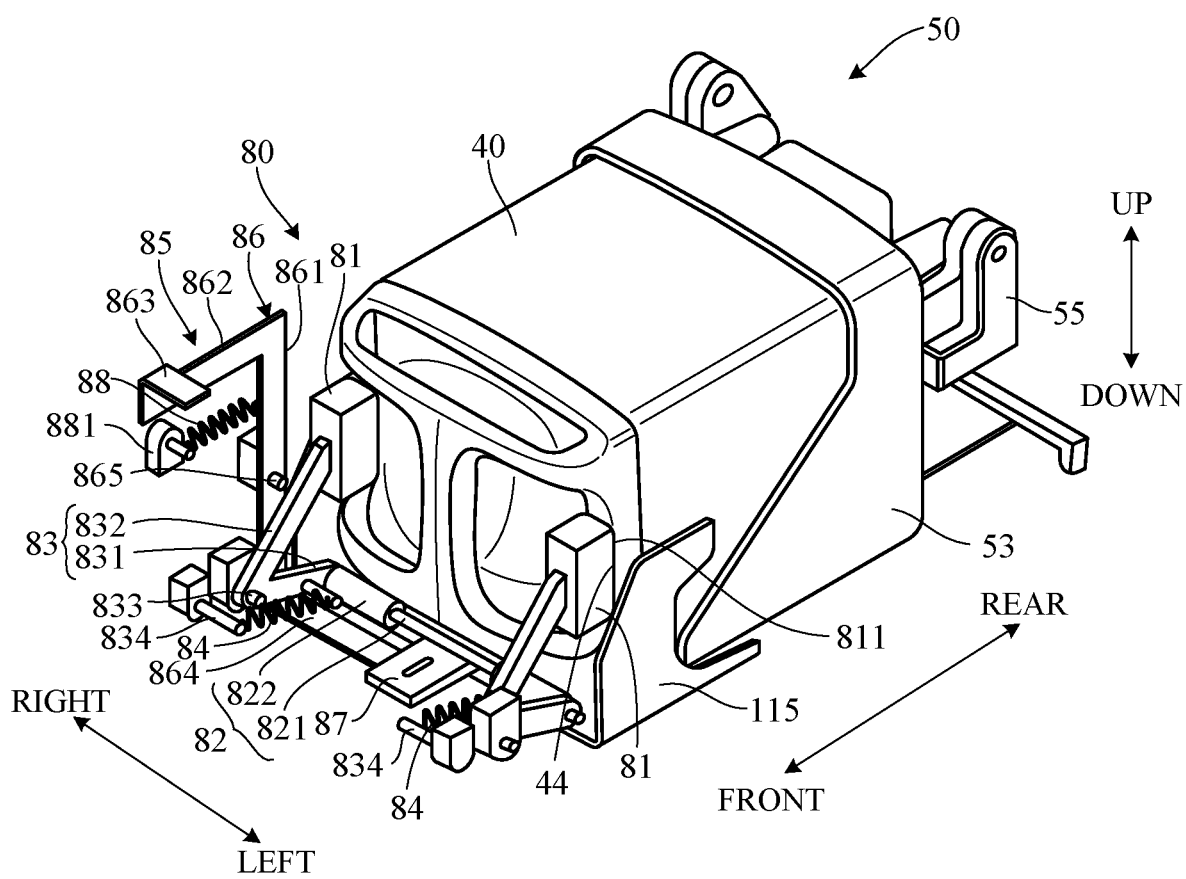
FIG. 24A is a perspective view showing a configuration of main components of the battery housing apparatus according to a modification of the second embodiment of the present invention.
Figure 24B:
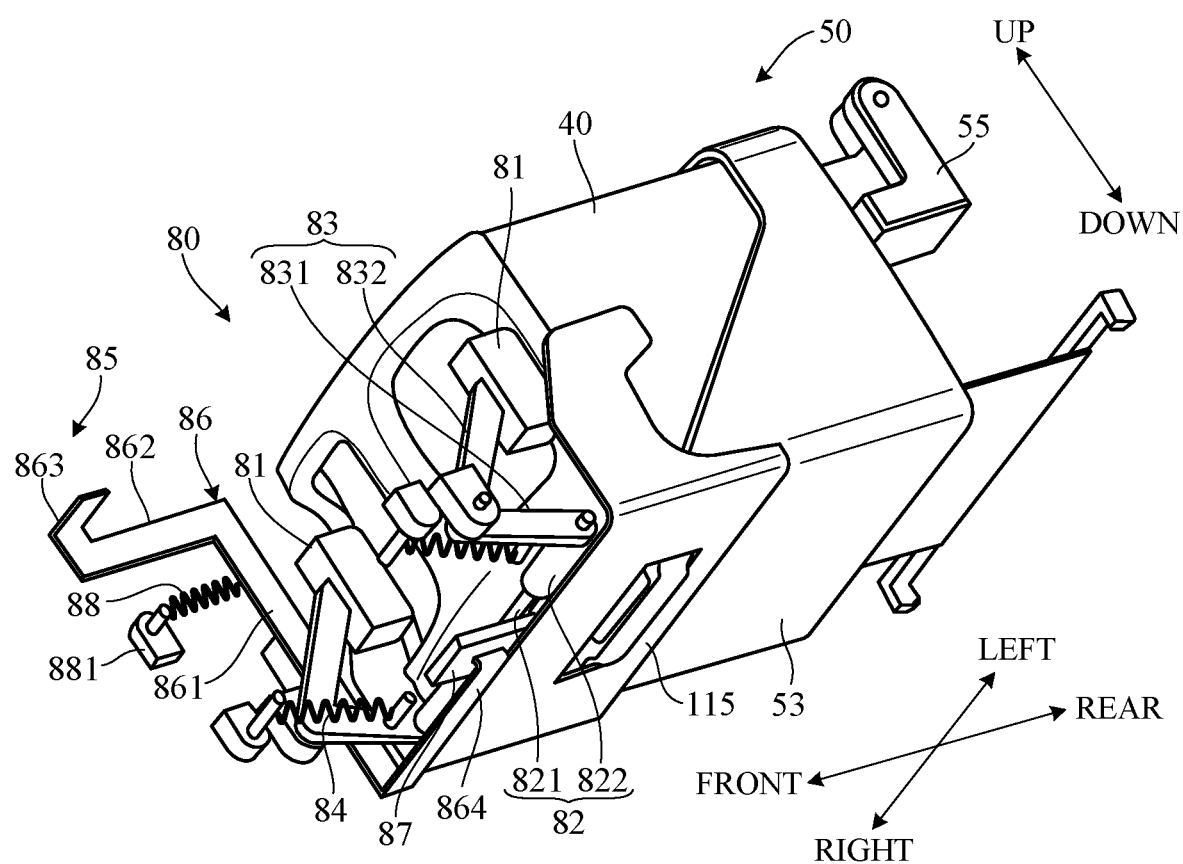
FIG. 24B is a perspective view showing the configuration of main components of the battery housing apparatus according to the modification of the second embodiment of the present invention, seen from a different direction from FIG. 24A.

FIG. 24A is a front top perspective view of a battery housing apparatus 50 according to a modification of the second embodiment. FIG. 24B is a front bottom perspective view thereof. In FIGS. 24A and 24B, the battery 40 is held in the housed position, and a holder 53 is in the horizontal posture. In FIGS. 24A and 24B, the same components as those in FIGS. 22A to 22C are given the same reference signs.

As shown in FIGS. 24A and 24B, the battery housing apparatus 50 according to the modification includes a holding mechanism 80 that holds the battery 40 in the housed position. The holding mechanism 80 includes a pair of left and right movable blocks 81, a press-down bar 82 extending in the left-right direction, coupling plates 83 that couple the left and right movable blocks 81 and the left and right ends of the press-down bar 82, and a lock mechanism 85 that fixes the battery 40 to the housed position. In FIGS. 24A and 24B, a support plate 115 that is fixed to side frames 11 and supports the bottom of the holder 53 extends to near the front end of the battery 40 in the housed posture.

The movable blocks 81 have a configuration similar to that of the movable blocks 71 according to the second embodiment. That is, the movable blocks 81 are made of an elastic material (e.g., a hard rubber material, etc.), and the rear surfaces 811 thereof take shapes (e.g., partial arc shapes) corresponding to the front surfaces of the protrusions 44 of the battery 40 so as to press the front surfaces of the protrusions 44.

The press-down bar 82 also has a configuration similar to that of the press-down bar 72 according to the second embodiment. That is, the press-down bar 82 includes an approximately cylindrical rod 821 extending in the left-right direction and a pair of left and right approximately cylindrical bar members 822 mounted so as to surround the outer circumferential surface of the rod 821. The bar members 822 differ from the bar member according to the second embodiment disposed on the central portion in the left-right direction.

The left and right coupling plates 83 each includes a first plate 831 extending approximately in the front-rear direction and a second plate 832 extending upward and rearward from the front end of the first plate 831 and are formed in a V-shape. The left and right ends of the rod 821 of the press-down bar 82 penetrate the rear ends of the first plates 831. The front surfaces of the movable blocks 81 are fixed to the upper ends of the second plates 832. The front ends of the first plates 831 (the lower ends of the second plates 832) are rotatably supported by the left and right side frames 11 (FIG. 2) through a shaft 833 extending in the left-right direction.

Spring support portions 834 fixed to the side frames 11 are disposed in front of the shaft 833. Ends of tensile springs 84 consisting of, for example, coil springs are supported by the spring support portions 834, and the other ends of the tensile springs 84 are supported by the first plates 831. When the battery 40 is located in the housed position, the tensile springs 84 extend along the first plates 831 and are located on a straight line connecting the center of the press-down bar 82 and the center of the shaft 833 (see FIG. 25A).

Figure 25A:
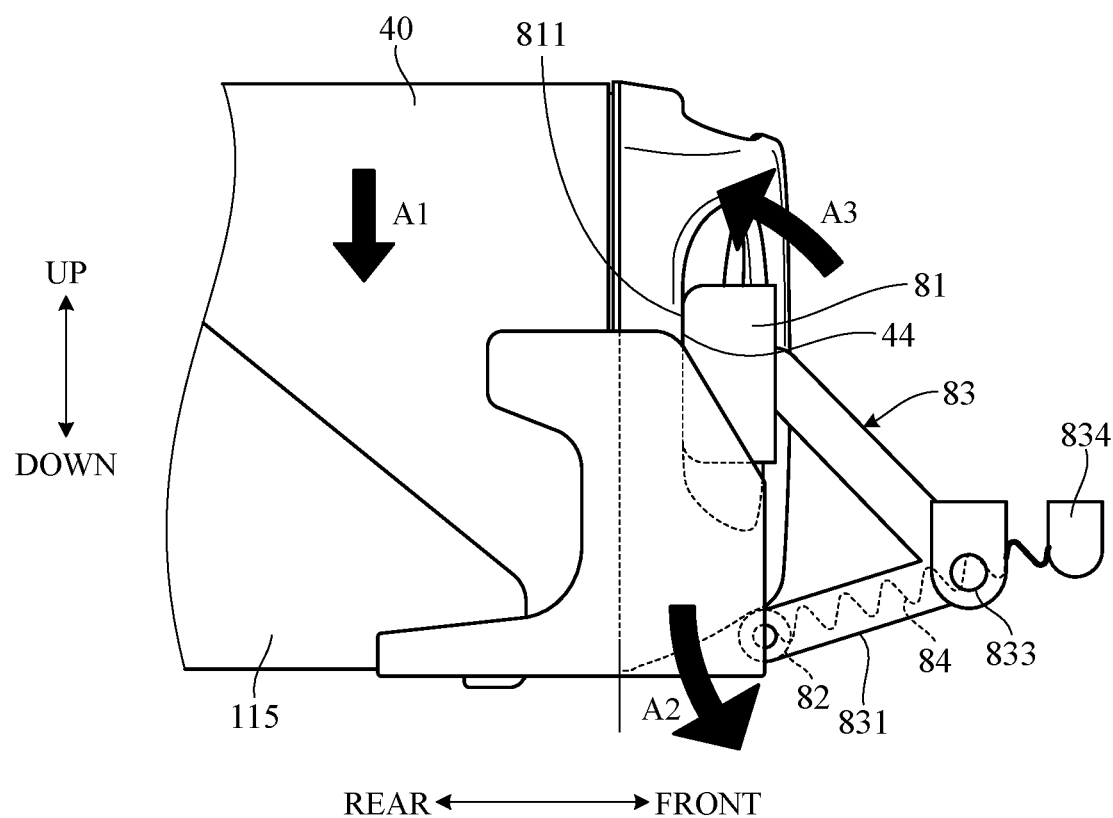
FIG. 25A is a side view showing an example of an operation of the battery housing apparatus according to a modification of the second embodiment of the present invention.
Figure 25B:
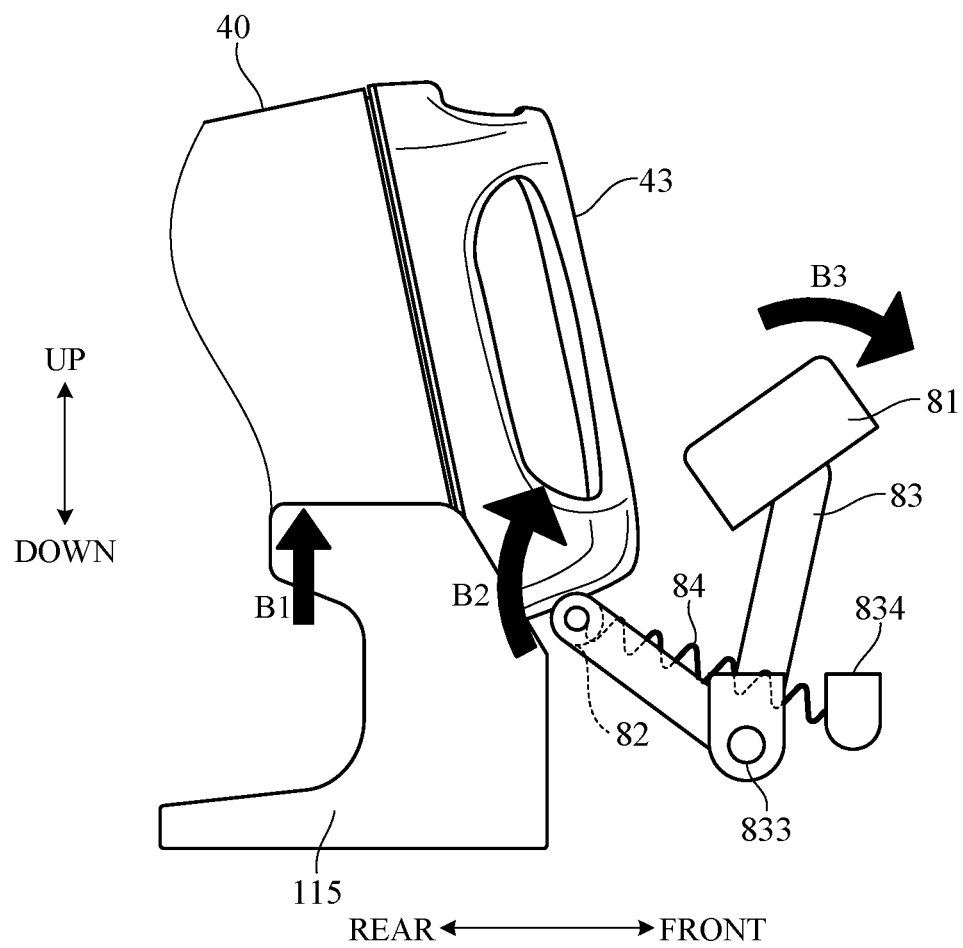
FIG. 25B is a side view showing an example of an operation following FIG. 25A.

FIGS. 25A and 25B are side views showing the configuration of major components of the holding mechanism 80 and correspond to the housed position and the intermediate position, respectively, of the battery 40. The lock mechanism 85 is not shown in FIGS. 25A and 25B. When the user presses the battery 40 in the direction of an arrow Al in FIG. 25A (rearward) to change the posture of the battery 40 from the inclined posture to the horizontal posture, the bottom of the front end of the battery 40 contacts the press-down bar 82 (bar member 822) and the press-down bar 82 is pressed down against the biasing force of the tensile springs 84 using the shaft 833 as a pivot, as shown by an arrow A2 in FIG. 25A.

Thus, as shown by an arrow A3 in FIG. 25A, the movable blocks 81 move forward using the shaft 833 as a pivot, and the protrusions 44 of the battery 40 are pressed rearward by the rear surfaces 811 of the movable blocks 81. In this state, the tensile springs 84 are located on the straight line connecting the press-down bar 82 and shaft 833. Thus, the tensile springs 84 do not give a moment to the coupling plates 83, and the battery 40 is easily held in the housed position.

On the other hand, when the user grasps the grip 43 on the front end of the battery 40 in the housed posture and lifts the battery 40, as shown by an arrow B1 in FIG. 25B, the press-down bar 82 moves upward by the biasing force of the tensile springs 84 using the shaft 833 as a pivot, as shown by an arrow B2 in FIG. 25B. Also, the movable blocks 81 move forward using the shaft 833 as a pivot, as shown by an arrow B3 in FIG. 25B. Thus, the movable blocks 81 retreat forward from the movement track of the battery 40, allowing the user to easily remove the battery 40. After removing the battery 40, the length of the tensile springs 84 becomes, for example, the equilibrium length and thus the coupling plates 83 are held in the positions in FIG. 25B. A stopper mechanism may be used to hold the coupling plates 83 in the positions in FIG. 25B.

As shown in FIGS. 24A and 24B, the lock mechanism 85 includes a lever 86 operated by the user and a lock plate 87 that moves to the lock position or the non-lock position in accordance with the operation of the lever 86. The lever 86 is formed, for example, by bending a plate member. More specifically, the lever 86 includes a longitudinal plate 861 extending in the up-down direction on the right side of the right coupling plate 83, a front plate 862 extending forward from the upper end of the longitudinal plate 861, an approximately L-shaped operation portion 863 extending upward and leftward from the front end of the front plate 862, and a lateral plate 864 passing below the first plate 831 of the coupling plate 83 and extending leftward from the lower end of the longitudinal plate 861 to the central portion in the left-right direction of the press-down bar 82.

The lock plate 87 is a plate member that passes between the left and right bar members 822, extends in the front-rear direction above the support plate 115, and has a shape elongated in the front-rear direction. An end of the lateral plate 864 of the lever 86 is mounted on the front end of the lock plate 87. The longitudinal plate 861 of the lever 86 is rotatably supported by the right side frame 11 through a shaft 865 extending in the left-right direction. A tensile spring 88 consisting of a coil spring is disposed in front of the longitudinal plate 861. One end of the tensile spring 88 is coupled to a spring support portion 881 fixed to the side frame 11, and the other end thereof is coupled to the longitudinal plate 861. Thus, a biasing force using the shaft 865 as a pivot always acts on the lever 86 so as to move the lower end of the longitudinal plate 861 rearward. Thus, the lock plate 87 is biased rearward.

Figure 26A:
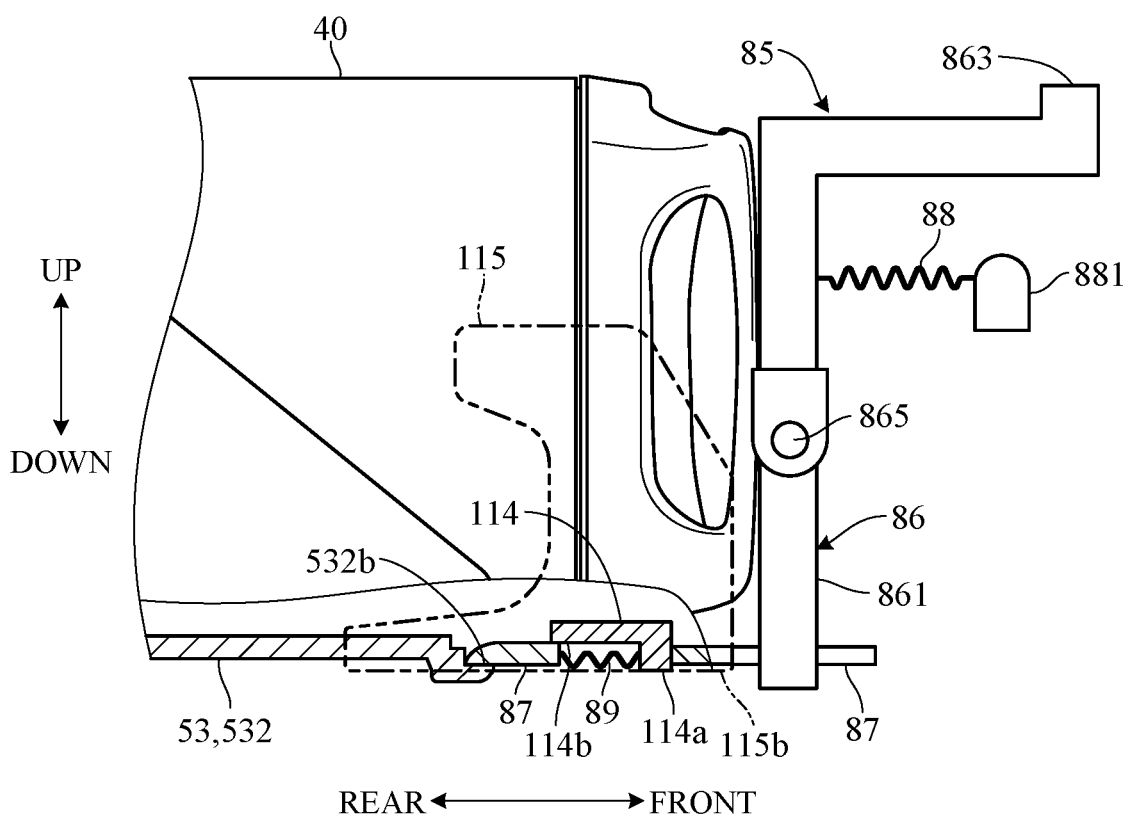
FIG. 26A is a side view showing an example of another operation of the battery housing apparatus according to the modification of the second embodiment of the present invention.
Figure 26B:
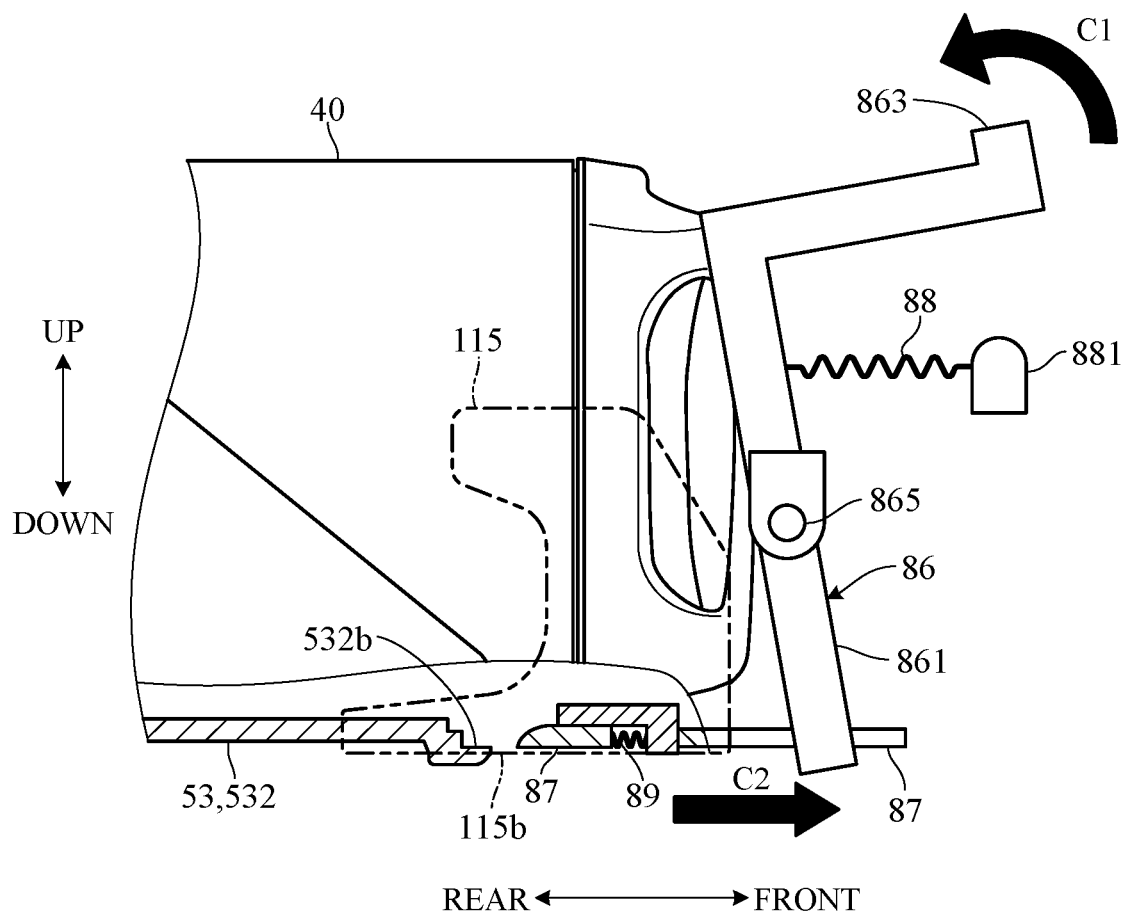
FIG. 26B is a side view showing an example of an operation following FIG. 26A.

FIGS. 26A and 26B are side views (partial sectional views) showing the configuration of the lock mechanism 85. FIG. 26A shows the lock state in which the lock plate 87 moves to the lock position, and FIG. 26B shows the non-lock state in which the lock plate 87 moves to the non-lock position. In FIGS. 26A and 26B, the external shape of the support plate 115 is shown by a two-dot chain line.

As shown in FIG. 26A, a guide 114 for guiding the lock plate 87 is disposed on the bottom wall 115b of the support plate 115. The guide 114 includes a first wall 114a provided with a through hole or notch through which the lock plate 87 passes and a second wall 114b extending rearward from the upper end of the first wall 114a. An elongated notch or through hole (hereafter referred to as the spring housing portion) is formed in the lock plate 87 in the front-rear direction, and a compression spring 89 consisting of, for example, a coil spring is housed in the spring housing portion.

The front end of the compression spring 89 contacts the first wall 114a of the guide 114, and the rear end thereof contacts an edge of the spring housing portion. Thus, the biasing force of the compression spring 89 always acts on the lock plate 87, which is then biased rearward. Note that the biasing force of the tensile spring 88 also acts on the lock plate 87 rearward and therefore one of the tensile spring 88 and compression spring 89 may be omitted.

The front end of the bottom wall 532 of the holder 53 is provided with a recess 532b that is open forward. As shown in FIG. 26A, when the lock plate 87 is located in the lock position in which it is pushed rearward, the rear end of the lock plate 87 is engaged with the recess 532b. Thus, the holder 53 is held in the horizontal posture, and the battery 40 is fixed to the housed position.

On the other hand, as shown by an arrow C1 in FIG. 26B, when the operation portion 863 of the lever 86 is operated rearward, the lever 86 rotates against the biasing force of the tensile spring 88 and compression spring 89 using the shaft 865 as a pivot. Thus, as shown by an arrow C2 in FIG. 26B, the lock plate 87 moves to the non-lock position in front, and the rear end of the lock plate 87 departs from the recess 532b of the holder 53. As a result, the lock mechanism 85 is unlocked, and the holder 53 is allowed to rotate toward the inclined posture.

When the user leaves the hand from the operation portion 863 of the lever 86, the lock plate 87 moves to the lock position by the biasing force of the springs 88 and 89. For this reason, when moving the battery 40 from the intermediate position in FIG. 25B to the housed position in FIG. 25A, the user temporarily moves the lock plate 87 to the non-lock position by operating the operation portion 863 of the lever 86, as shown in FIG. 26B. After the battery 40 moves to the housed position, the user locks the battery 40 in the housed position by leaving the hand from the operation portion 863 and moving the lock plate 87 to the lock position.

Figure 27:
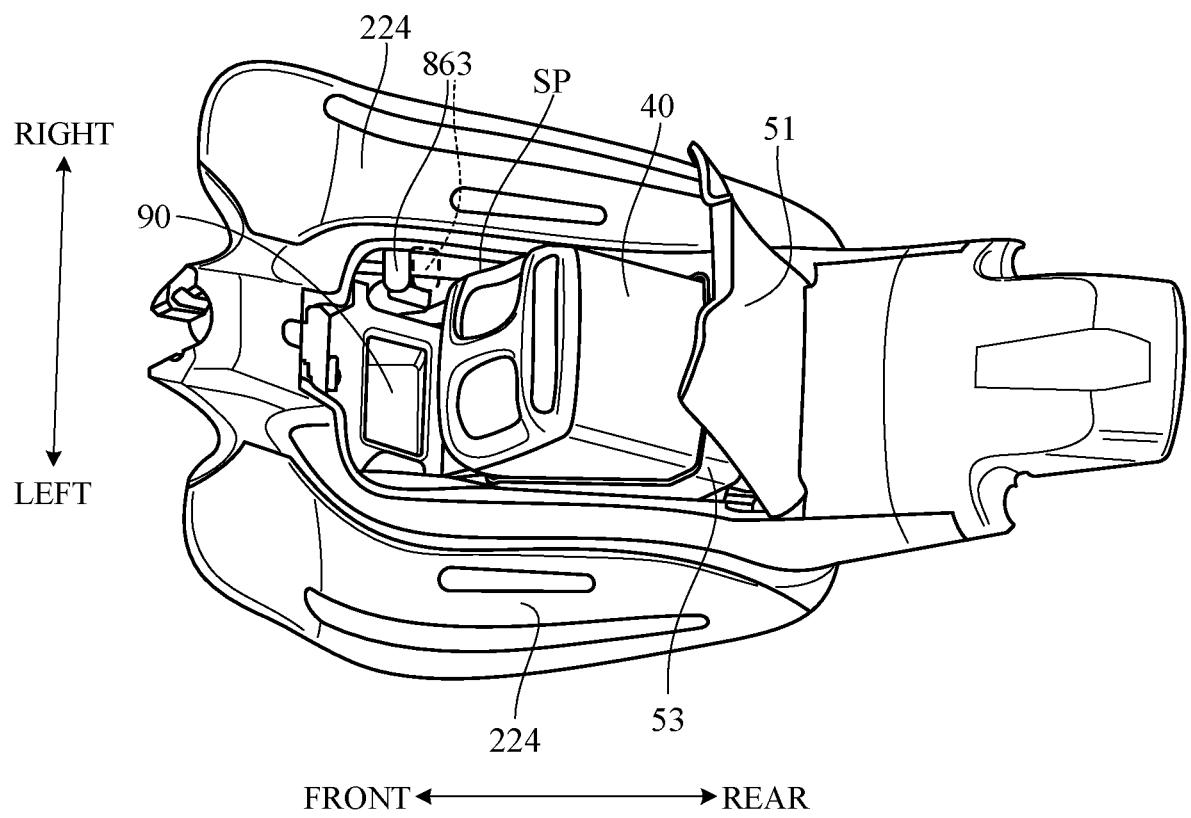
FIG. 27 is a perspective view when a floor cover of the electric vehicle to which the battery housing apparatus according to the modification of the second embodiment of the present invention is applied, is seen from an obliquely upward.

FIG. 27 is a perspective view showing an example of operation performed when mounting and removing the battery 40 on and from the battery housing apparatus 50 according to the modification of the second embodiment. In FIG. 27, the operation portion 863 of the lock mechanism 85 yet to be operated by the user and that operated by the user are shown by a solid line and a dotted line, respectively. FIG. 27 shows the battery 40 located in the inserted/removed position. A small battery having a short total length is used as the battery 40. Since a surplus space is made in front of the battery 40 and on the left side of the operation portion 863 in the housing space SP, a housing box 90 is formed in the surplus space.

A small battery 40 similar to that shown in FIG. 27 may be used in the first and second embodiments. Use of the small battery 40 allows the user to easily move the battery 40 through between the lid 51 and front cover 210, that is, allows the user to more easily mount and remove the battery 40 (on and from the inserted/removed position).

As seen above, in the modification of the second embodiment, the holding mechanism 70 includes the lock mechanism 85 that fixes the battery 40 to the housed position. In particular, the lock mechanism 85 includes the lock plate 87 disposed so as to be engageable with the holder 53 so that the battery 40 is fixed to the housed position (FIGS. 26A, 26B). Thus, the battery 40 is firmly fixed to the housed position. Also, there is no need to dispose battery support portions 117 (FIG. 21A) on the side frames 11, and a surplus space is easily made in front of the battery 40 in the housed posture.

Also, in the modification of the second embodiment, the coupling plates 83 connecting the movable blocks 81 and press-down bar 82 are rotatably supported through the shaft 833, and the tensile springs 84 that exert a biasing force so that the movable blocks 81 retreat are connected to the coupling plates 83 (FIG. 24A). When the battery 40 is located in the housed position, the tensile springs 84 are disposed on the straight line connecting the shaft 833 and press-down bar 82 (FIG. 25A). Thus, when the battery 40 is located in the housed position, a moment caused by the tensile springs 84 using the shaft 833 as a pivot is prevented from acting on the coupling plates 83 and the movable blocks 81 are stably held in the pressing positions. Note that the biasing portions for biasing the movable blocks 81 need not be the tensile springs 84 and may consist of another type of coil springs or stretchable members other than coil springs which are linearly stretchable.

Figure 28:
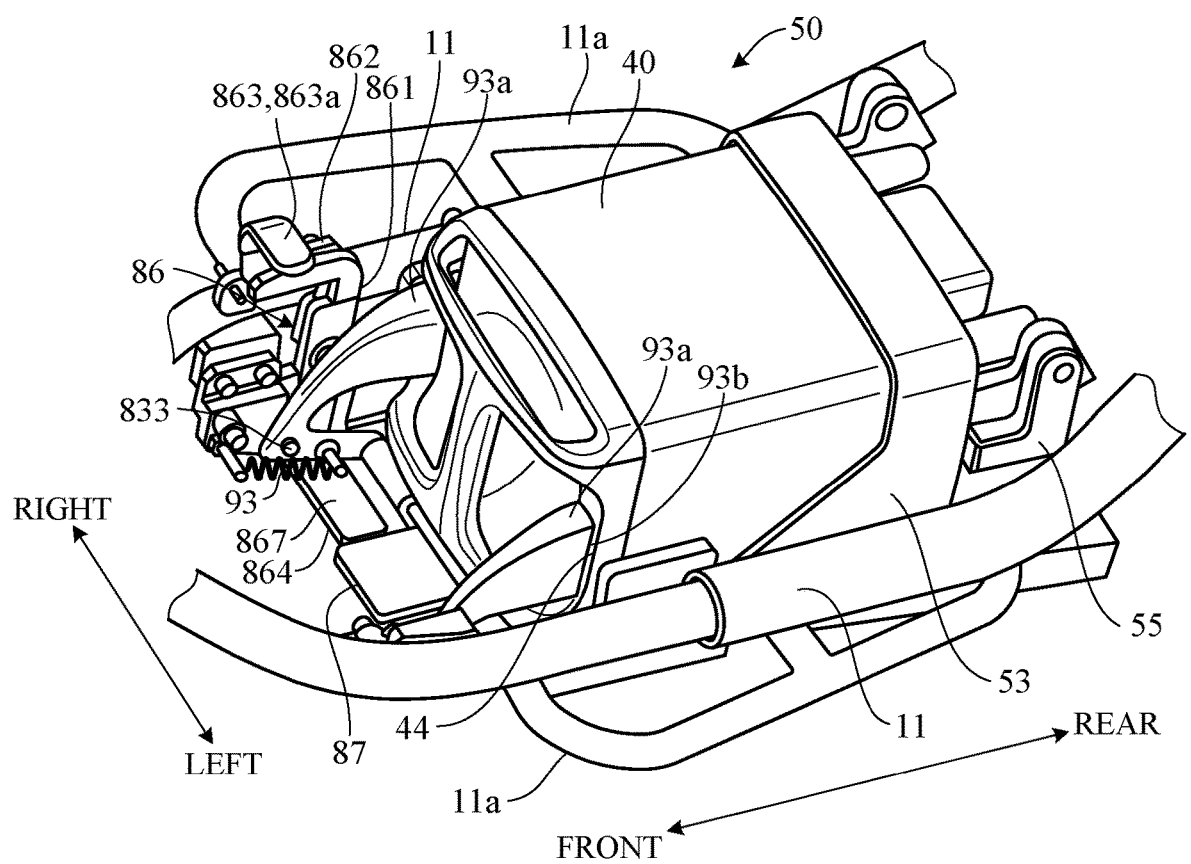
FIG. 28 is a perspective view showing the battery housing apparatus according to another modification of the second embodiment of the present invention.

While, in the above modification, the movable blocks 81 (pressing portions) and the coupling plates 83 (coupling portions) are separately disposed, these members may be integral members. FIG. 28 is a perspective view showing an example thereof. As shown in FIG. 28, coupling plates 93 are formed in an approximately V-shape such that more upper and rear portions than a shaft 833 gradually have larger thicknesses (lengths) in the up-down direction and left-right direction. Pressing portions 93a having rear surfaces having approximately the same shape as that of the rear surfaces 811 of the movable blocks 81 are disposed on the upper ends of the coupling plates 93. Elastic members (e.g., hard rubber members, etc.) are mounted on (for example, bonded to) the rear surfaces of the pressing portions 93a, that is, the end surfaces that contact the protrusions 44 of the battery 40.

By disposing the pressing portions 93a on the coupling plates 93 as described above, the number of components is reduced and the configuration is simplified. Instead of disposing the pressing portions 93a on the coupling plates 93, the coupling plates and movable blocks may be integrated, for example, by covering them with covers. In FIG. 28, to improve the operability of the operation portion 863, a cover 863a that covers the entire operation portion 863 and is made of, for example, a resin is mounted on the operation portion 863. Also, a cover 867 is mounted on the lever 86 so as to extend from the front plate 862 to the longitudinal plate 861 and the lateral plate 864. A pair of left and right step frames 11a for supporting steps 224 are mounted on the side frames 11.

Other embodiments or modifications will be described below. While, in the above embodiments, the battery housing apparatus 50 is used in the electric vehicle 100 including the two front wheels 1 and the one rear wheel 2 (FIG. 1A), the present invention can also be used in a similar manner in other types of electric vehicles that include a travel motor, such as those including one front wheel and two rear wheels, two front wheels and two rear wheels, or one front wheel and one rear wheel. Similarly, the present invention can be used in vehicles in which a front wheel and a rear wheel are not clearly distinguished, such as a one-wheel vehicle and a vehicle in which multiple wheels are disposed in the left-right direction rather than in the front-rear direction. The present invention can also be used in electric vehicles that do not include a seat on which a passenger is seated.

Figure 29:
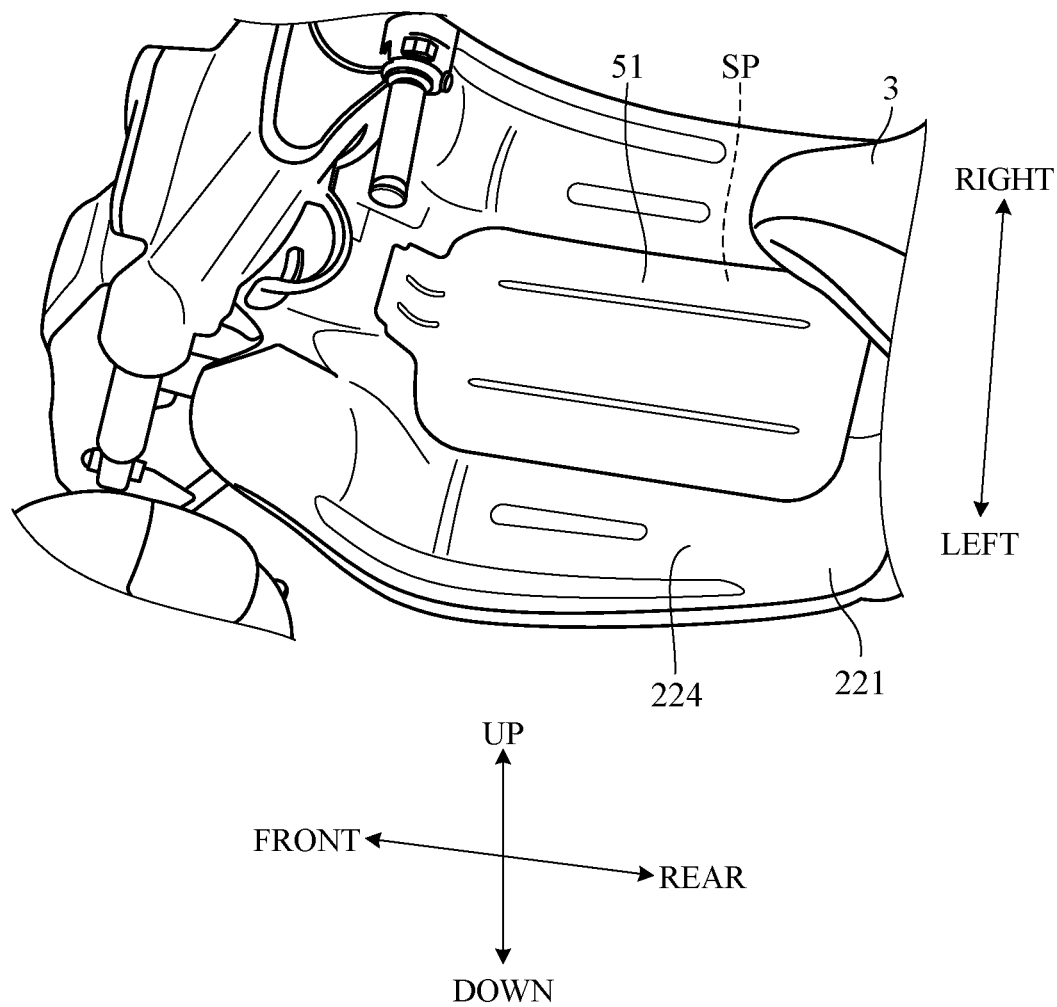
FIG. 29 is a perspective view showing a modification of FIG. 8.

While, in the above embodiments, the housing space SP for the battery 40 is formed inside the side frames 11, the configuration of a housing portion is not limited to that described above. While, in the above embodiments, the housing space SP for the battery 40 is formed on the inside in the left-right direction of the pair of left and right steps 224 serving as a placement portion on which the left and right legs of a passenger are placed (FIG. 8), a housing space may be formed below the placement portion. FIG. 29 is a perspective view showing an example thereof. In FIG. 29, the upper surface of a top cover 221 is formed so as to be flat, and the entire upper surface of the top cover 221 is used as a step 224. An openable lid 51 is disposed on the central portion in the left-right direction of the top cover 221 so as to face a housing space SP.

While, in the above embodiments, the battery 40 is held by the holder 53 rotatably supported by the side frames 11 (FIG. 2), the configuration of a holding portion for removably holding the battery is not limited to that described above. That is, the holding portion may have any configuration as long as the battery 40 is movably supported by the holding portion such that the battery moves from the non-housed position in which the battery has yet to be housed in the housing space SP to the housed position. While, in the above embodiments, the opening 223a of the housing space SP is covered by the openable lid 51 (FIG. 8), the configuration of a cover portion is not limited to that described above. While, in the above embodiments, the holder 53 is supported by the frame 10 so as to be rotatable using, as pivots, the shafts 56 extending along the axis in the left-right direction (FIG. 9B), the configuration of a support portion is not limited to that described above.

While, in the second embodiment, the battery 40 is held in the housed position in the housing space SP by the holding mechanism 70 or 80 through the holder 53, the configuration of a holding mechanism is not limited to that described above. While, in the second embodiment, the press-down bar 72 or 82 is disposed below the battery 40, the press-down bar may be disposed below the holder 53 serving as a holding portion. That is, the configuration of an input force portion that receives an external force when the battery moves is not limited to that described above as long as the input force portion is movably disposed on the movement track of the battery or holding portion on which the battery moves from the non-housed position to the housed position. While, in the second embodiment, the movable blocks 71 or 81 serving as a pressing portion and the press-down bar 72 or 82 serving as an input force portion pushed by the battery 40 are coupled by the coupling plates 73 or 83, the configuration of a coupling portion is not limited to that described above.

While, in the second embodiment, movement of the coupling plates 73 or 83 serving as a coupling portion is regulated by the link plates 74 or shaft 833, the configuration of a regulation portion is not limited to that described above. While, in the second embodiment, a pressing surface corresponding to the front surface (a pressed surface) of the protrusions 44 of the battery 40 is formed on the rear surfaces 711 or 811 of the movable blocks 71 or 81, the configuration of the pressing portion having the pressing surface is not limited to that described above. While, in the above embodiments, the battery support portions 117 are disposed in front of the battery 40, the configuration of a pressure receiving portion disposed so as to face a pressed surface of the battery is not limited to that described above.

While, in the second embodiment, the movable blocks 71 or 81 are biased toward the non-pressing positions by the tensile springs 75 or 84, the configuration of a biasing portion is not limited to that described above. While, in the second embodiment, the coupling plates 83 are rotatably supported by the shaft 833, the configuration of a pivotal support portion is not limited to that described above. While, in the second embodiment, the battery 40 located in the housed position is pressed toward the terminal unit 54 by the movable blocks 71 or 81, the configuration of a terminal portion connected to the battery is not limited to that described above. While, in the second embodiment, the holding mechanism 80 includes the lock mechanism 85, an engagement mechanism may have any configuration as long as the engagement mechanism (lock plate 87, etc.) is provided so as to be engageable with the holding portion (holder 53) such that the battery 40 is fixed to the housed position.

While, in the above embodiments, the battery housing apparatus 50 that forms the housing space SP for the battery 40 is disposed on the electric vehicle 100, it may be disposed on entities other than an electric vehicle. For example, a battery housing apparatus as described above may be disposed on a charge facility capable of simultaneously charging multiple batteries 40. That is, the configuration of the battery housing apparatus is not limited to that described above as long as it includes a housing portion that forms a housing space in which a battery is removably housed, a holding portion that holds the battery, and an openable cover portion that closes the housing space and the housing portion includes a support portion that rotatably supports the holding portion about a rotational axis such that the battery is movable between the housed position and the non-housed position in the housing space.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LOST 11 side frame, 40 battery, 50 battery housing apparatus, 51 lid, 53 holder, 56 shaft, 70,80 holding mechanism, 71,81 movable block, 72,82 press-down bar, 73,83 coupling plate, 74 link plate, 100 electric vehicle, 224 step, 833 shaft, SP housing space

The invention claimed is:

1. A battery housing apparatus, comprising:
   a housing portion configured to form a housing space of a battery, the battery being removably housed in the housing space;
   a holding portion configured to hold the battery; and
   a cover portion configured to close the housing space in an openable manner, wherein
   the housing portion includes a support portion rotatably supporting the holding portion about a rotational axis so that the battery is movable between a housed position and a non-housed position in the housing space, and
   the support portion includes a first link rotatably supporting the holding portion, below a center line passing through a center in an up-down direction of the battery disposed in the housing space, and a second link rotatably supporting the holding portion above the center line.

2. The battery housing apparatus according to claim 1, further comprising
   a holding mechanism configured to hold the battery in the housed position through the holding portion, wherein
   the holding mechanism includes:
   a pressing portion pressing the battery located in the housed position;
   an input force portion movably disposed on a movement track of the battery or the holding portion when the battery moves from the non-housed position to the housed position, and
   a coupling portion coupling the pressing portion and the input force portion so that the pressing portion moves along with a movement of the input force portion.

3. The battery housing apparatus according to claim 2, wherein
   the holding mechanism further includes a regulation portion regulating an operation of the coupling portion so that the pressing portion moves from a non-pressing position before pressing the battery to a pressing position pressing the battery when the battery moves from the non-housed position to the housed position.

4. The battery housing apparatus according to claim 3, wherein
   the pressing portion includes a pressing surface corresponding to a pressed surface of the battery, and
   the regulation portion regulates the operation of the coupling portion so that the pressing surface of the pressing portion presses the pressed surface of the battery when the battery is located in the housed position, while the pressing portion retreats from the movement track of the battery when the battery is located in the non-housed position.

5. The battery housing apparatus according to claim 4, wherein
the housing portion includes a pressure receiving portion disposed facing the pressed surface of the battery, and
the regulation portion regulates the operation of the coupling portion so that the pressing portion is pressed between the pressure receiving portion and the pressed surface of the battery when the battery moves from the non-housed position to the housed position.

6. The battery housing apparatus according to claim 5, wherein
the holding mechanism further includes a biasing member biasing the pressing portion toward the non-pressing position.

7. The battery housing apparatus according to claim 6, wherein
the regulation portion includes a pivotal support portion pivotally supporting the coupling portion,
the biasing member includes a stretchable member, and
the stretchable member is disposed on a straight line connecting the pivotal support portion and the input force portion when the battery is located in the housed position.

8. The battery housing apparatus according to claim 2, wherein
the input force portion is disposed below the battery or the holding portion so as to be pressed by the battery or the holding portion when the battery moves from the non-housed position to the housed position.

9. The battery housing apparatus according to claim 2, further comprising
a terminal portion connected to the battery, wherein
the pressing portion is configured to press the battery located in the housed position toward the terminal portion.

10. The battery housing apparatus according to claim 2, wherein
the holding mechanism further includes an engagement mechanism configured to be engageable with the holding portion so as to fix the battery to the housed position.

11. A battery housing apparatus, comprising:
a housing portion configured to form a housing space of a battery, the battery being removably housed in the housing space;
a holding portion configured to hold the battery; and
a cover portion configured to close the housing space in an openable manner, wherein
the housing portion includes a support portion rotatably supporting the holding portion about a rotational axis so that the battery is movable between a housed position and a non-housed position in the housing space,
the support portion supports the holding portion so that a posture of the battery becomes a predetermined inclined posture in which an end of the battery is located above another end of the battery when the battery is located in the non-housed position,
the cover portion is supported so as to be rotatable from a closed position closing the housing space to an open position opening the housing space,
a posture of the cover portion becomes a substantially horizontal posture in the closed position and a predetermined inclined posture in the open position, and
an inclination angle with respect to a horizontal line of the cover portion located in the open position is larger than an inclination angle with respect to the horizontal line of the holding portion located in the non-housed position.

12. The battery housing apparatus according to claim 11, further comprising
a non-housing holding mechanism configured to hold the holding portion in the non-housed position.

13. The battery housing apparatus according to claim 11, further comprising
a biasing member configured to bias the holding portion toward the non-housed position.

14. A battery housing apparatus, comprising:
a housing portion configured to form a housing space of a battery, the battery being removably housed in the housing space;
a holding portion configured to hold the battery; and
a cover portion configured to close the housing space in an openable manner, wherein
the housing portion includes a support portion rotatably supporting the holding portion about a rotational axis so that the battery is movable between a housed position and a non-housed position in the housing space,
the holding portion includes a support wall formed in a substantially rectangular shape on which the support portion is disposed, and a top wall, a bottom wall, a left side wall and a right side wall, the top wall, the bottom wall, the left side wall and the right side wall being protruded from the support wall, respectively, and formed in a frame shape so as to cover an upper portion, a bottom portion, a left portion and a right portion of the battery housed in the housing space, and
an amount of protrusion of the bottom wall is greater than an amount of protrusion of the upper wall.

15. An electric vehicle comprising:
a battery housing apparatus;
a battery configured to supply electric power to a travel motor; and
a placement portion on which left and right legs of a passenger are placed, wherein
the battery housing apparatus includes:
a housing portion configured to form a housing space of the battery, the battery being removably housed in the housing space;
a holding portion configured to hold the battery; and
a cover portion configured to close the housing space in an openable manner,
the housing portion includes a support portion rotatably supporting the holding portion about a rotational axis so that the battery is movable between a housed position and a non-housed position in the housing space, and
the housing space is formed below the placement portion or between left and right placement portions in a left-right direction.

16. The electric vehicle according to claim 15, further comprising
a seating portion on which a passenger is seated, and
the rotational axis is located behind a foremost portion of the seating portion.

17. The electric vehicle according to claim 15, further comprising
a seating portion on which a passenger is seated,
the rotational axis serving as a pivot of the holding portion is a first axis, the cover portion is provided rotatably about a second axis extending in the left-right direction, and the second axis is located behind a foremost portion of the seating portion.

18. The electric vehicle according to claim 16, further comprising a seating support portion configured to movably support the seating portion behind a seating position in which the passenger is seated.

19. A battery housing apparatus, comprising:

a housing portion configured to form a housing space of a battery, the battery being removably housed in the housing space;

a holding portion configured to hold the battery; and a holding mechanism configured to hold the battery in a housed position in the housing space through the holding portion, wherein the holding portion is supported at the housing portion rotatably about a rotational axis so that the battery moves from a non-housed position before the battery is housed in the housing space to the housed position, and the holding mechanism includes:

a pressing portion pressing the battery located in the housed position;

an input force portion movably disposed on a movement track of the battery or the holding portion when the battery moves from the non-housed position to the housed position, and a coupling portion coupling the pressing portion and the input force portion so that the pressing portion moves along with a movement of the input force portion.

* * * * *